United States Patent
Nakamura et al.

(10) Patent No.: US 8,244,955 B2
(45) Date of Patent: Aug. 14, 2012

(54) STORAGE SYSTEM AND ITS CONTROLLING METHOD

(75) Inventors: Shuji Nakamura, Machida (JP); Masanori Takada, Yokohama (JP)

(73) Assignee: Hitachi, Ltd., Tokyo (JP)

(*) Notice: Subject to any disclaimer, the term of this patent is extended or adjusted under 35 U.S.C. 154(b) by 446 days.

(21) Appl. No.: 12/527,446

(22) PCT Filed: Mar. 17, 2009

(86) PCT No.: PCT/JP2009/055729
§ 371 (c)(1), (2), (4) Date: Aug. 17, 2009

(87) PCT Pub. No.: WO2010/106692
PCT Pub. Date: Sep. 23, 2010

(65) Prior Publication Data
US 2010/0306463 A1 Dec. 2, 2010

(51) Int. Cl.
G06F 12/08 (2006.01)
(52) U.S. Cl. ............ 711/6; 711/113; 711/E12.019
(58) Field of Classification Search ............. None
See application file for complete search history.

(56) References Cited

U.S. PATENT DOCUMENTS

| | | | |
|---|---|---|---|
| 5,581,736 A | 12/1996 | Smith | |
| 5,860,083 A * | 1/1999 | Sukegawa | 711/103 |
| 6,370,614 B1 * | 4/2002 | Teoman et al. | 711/113 |
| 6,397,242 B1 | 5/2002 | Devine et al. | |
| 7,702,843 B1 * | 4/2010 | Chen et al. | 711/6 |
| 7,853,759 B2 * | 12/2010 | Sadovsky et al. | 711/154 |
| 2004/0117587 A1 * | 6/2004 | Arimilli et al. | 711/203 |
| 2005/0240724 A1 | 10/2005 | Koizumi et al. | |
| 2006/0136653 A1 | 6/2006 | Traut et al. | |
| 2007/0106853 A1 * | 5/2007 | Evanchik et al. | 711/159 |
| 2008/0270733 A1 | 10/2008 | Sakaguchi et al. | |
| 2010/0082904 A1 * | 4/2010 | Juenemann et al. | 711/119 |

FOREIGN PATENT DOCUMENTS

| | | |
|---|---|---|
| EP | 1 686 473 A1 | 8/2006 |
| JP | 2005-309739 A | 11/2005 |
| JP | 2008-276326 A | 11/2008 |

OTHER PUBLICATIONS mypapit. "How to add Linux Swap file if you don't have Swap Partition." Jul. 2007. http://blog.mypapit.net/2007/07/how-to-add-linux-swap-file-if-you-dont-have-swap-partition.html.*
Michael R. Hines et al. "Anemone: Adaptive Network memory Engine." 2005. FSU Computer Science Dept. TR-050128.*
Stephen T. Jones et al. "Geiger: Monitoring the Buffer Cache in a Virtual Machine Environment." Oct. 2006. ACM. ASPLOS'06.*
Jenna Matthews et al. "Intel Turbo Memory: Nonvolatile Disk Caches in the Storage Hierarchy of Mainstream Computer Systems." May 2008. ACM. ACM Transactions on Storage. vol. 4.*
R. Jones, "Disc cache for PCs—Speedier access to disc storage", Mar. 1986, pp. 79-81, vol. 28, No. 2, Butterworth & Co. Publishers Ltd., London, GB.

* cited by examiner

*Primary Examiner* — Kevin Ellis
*Assistant Examiner* — Nathan N Sadler
(74) *Attorney, Agent, or Firm* — Mattingly & Malur, PC

(57) ABSTRACT

This invention, in the interface coupled to the server, the disk interface coupled to the second memory to store final data, the cache to store data temporarily, and in the storage system with the MP which controls them, specifies the area by referring to the stored data, and makes the virtual memory area resident in the cache by using the storage system where the specified area is made resident in the cache.

13 Claims, 31 Drawing Sheets

TYPICAL SWAP FILE NAME TABLE

| OS NAME | SWAP AREA |
|---|---|
| W1<br>W2 | "/pagefile.sys" |
| O1 | DESCRIBED IN "config.sys" | s1701 — s1702

| 2501 | 2502 |
|---|---|
| VM SOFTWARE NAME | EXTENSION |
| V1 | .xxx |
| V2 | .vvv |
| V3 | .xyz |

SET VM FILE

| | | | | |
|---|---|---|---|---|
| HOST OS LU | LU1 (2606) | PARTITION | 1 (2607) | |
| OS TYPE | W1 (2608) | | | |

[SEARCH] 2609    [REFERENCE] 2610

2601
VM FILE LIST

| RESIDENT SWAP AREA (2602) | VM FILE NAME (2603) | SWAP AREA SIZE (2604) | |
|---|---|---|---|
| ☑ | \home\aaa\vm123.vvv | 4GB | /4GB |
| ☑ | \home\aaa\vm231.vvv | 8GB | /8GB |
| ☐ | \home\bbb\vp111.xxx | --- | /2GB |
| ☐ | \home\ccc\vt133.zzz | --- | /16GB |

[OK] 2605

STORAGE SYSTEM AND ITS CONTROLLING METHOD

TECHNICAL FIELD

This invention generally relates to a storage system and its control method, and specifically to a storage system and its control method suitable for speeding up the virtual storage-related processing.

BACKGROUND ART

Recently, at information business sites such as data centers, it is becoming more and more important to reduce the total owning cost of systems. In order to reduce the total owning cost, adoption of a virtual machine (hereinafter referred to as the "VM") technology is being considered. An example of the VM technology is described in U.S. Pat. No. 6,397,242B.

With the VM technology, the server software runs a virtual CPU called a VM. Generally, the use environment of the server is not always a maximum load. Therefore, it is suggested that one physical server runs multiple VMs which are virtual servers. Thus the number of installed physical servers can be reduced, and the use of VMs can reduce, in addition to the installation cost, costs for the maintenance and management of servers and the power consumption of data centers.

However, since the OS (operating system) runs independently in each VM, the memory size required by each OS is the same in the operation of the physical server and in the operation of the VMs. Therefore, if multiple VMs run on a physical server whose main memory (physical memory) capacity is limited, the insufficiency of the memory capacity becomes significant. Meanwhile, the technology of providing memory capacity among multiple VMs is, for example, described in US2006/0136653A.

Furthermore, virtual memory is a measure for cases where programs require more memory size than the capacity of the physical memory. With the virtual memory technology, by using secondary storages such as hard disks and those including disk arrays, physical memory areas are allocated to the secondary storage, which makes it possible for the higher-level device to recognize a larger memory space than the physical memory capacity. Virtual memory includes, for example, those described in Japanese Patent Publication No. 2008-276326A and No. 2005-309739A.

Note that the No. 2005-309739A describes a storage system which a large-capacity cache memory and, by using a high-speed elemental device such as a DRAM, whose latency is several thousand times faster than secondary storage devices such as hard disk drives (HDDs).

DESCRIPTION OF RELATED ART

[Patent Documents]
[Patent Document 1]
Japanese Patent Application No. 2008-276326A
[Patent Document 2]
Japanese Patent Application No. 2005-309739A
[Patent Document 3]
U.S. Pat. No. 6,397,242
[Patent Document 4]
US2006/0136653

DISCLOSURE OF THE INVENTION

In data processing in the server, although the server program is assumed to access the physical memory with a high-speed response, if the program accesses the virtual memory area of a secondary storage, this becomes a low-speed access to the secondary storage, which deteriorates the performance of the program significantly. This is especially evident if the physical server is run as multiple VMs.

Therefore, an object of this invention is to provide a storage system as well as its control method which, if a virtual memory is set in a secondary storage, prevents the access performance of the server in accessing a virtual memory area from deteriorating. In addition, another object of this invention is to provide a storage system as well as its control method which, if the server runs multiple virtual machines, also prevents the response to the server from deteriorating.

In order to achieve the above-mentioned objects, this invention is characterized in storing data in the virtual memory area in the secondary storage in the cache memory with the high-speed response in advance so that the server can access the data in the virtual memory area in the cache memory.

According to this invention, a storage system as well as its control method which, if virtual memory is set in a secondary storage, prevents the access performance of the server in accessing a virtual memory area from deteriorating can be provided. In addition, according to this invention, a storage system as well as its control method which, if the server runs multiple virtual machines, also prevents the response to the server from deteriorating can be provided.

BRIEF DESCRIPTION OF THE DRAWINGS

FIG. 17 is a diagram that shows a typical swap file name table;

FIG. 25 is a block diagram that describes the extension table of virtual machine files;

FIG. 26 is a block diagram of the virtual machine file setting screen;

REFERENCE NUMERALS

Figure 1:
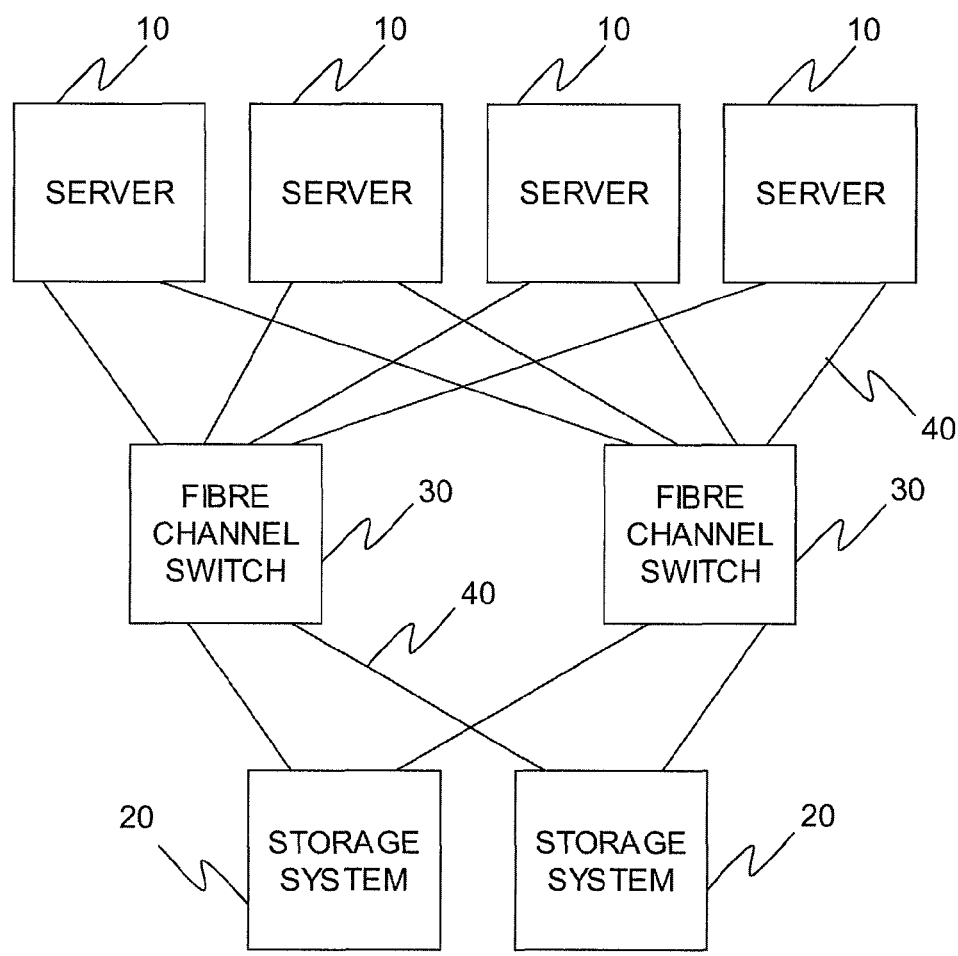
FIG. 1 is a block diagram that shows an example of a storage control system where storage systems related to this invention are installed.

10 Server
11 CPU
12 Main memory
13 Bridge
15 Bus
14 Host Bus Adaptor
20 Storage system
30 Fibre Channel Switch
40 Channel
111 MMU 111
201 Channel interface
203 Cache memory
204 MP
205 Internal switch
206 Control memory
207 SVP
210 HDD
220 Backend network
2061 Cache directory information
2062 LRU information
2063 Swap area table
206A I/O control program
206B Swap area registration program
206C VM file registration program
206h File system analysis routine
206x Mail box area
2700 VM file swap area table

BEST MODE FOR CARRYING OUT THE INVENTION

The first embodiment of this invention is described below with reference to the attached drawings. FIG. 1 is a block diagram that shows the configuration of a storage control system where storage systems of this invention are installed. Multiple servers 10 are coupled to storage systems 20 through channels 40. Each of the channels 40 is connected to a fibre channel switch 30 that comprises a storage area network. Each of the storage systems 20 has the function of providing multiple volumes or LUs (logical units), and stores its server's OS. The number of servers and storage systems may also be one each. If the storage systems have more channel ports than servers, multiple servers can be coupled to each of the storage systems without using fibre channel switches.

Figure 2:
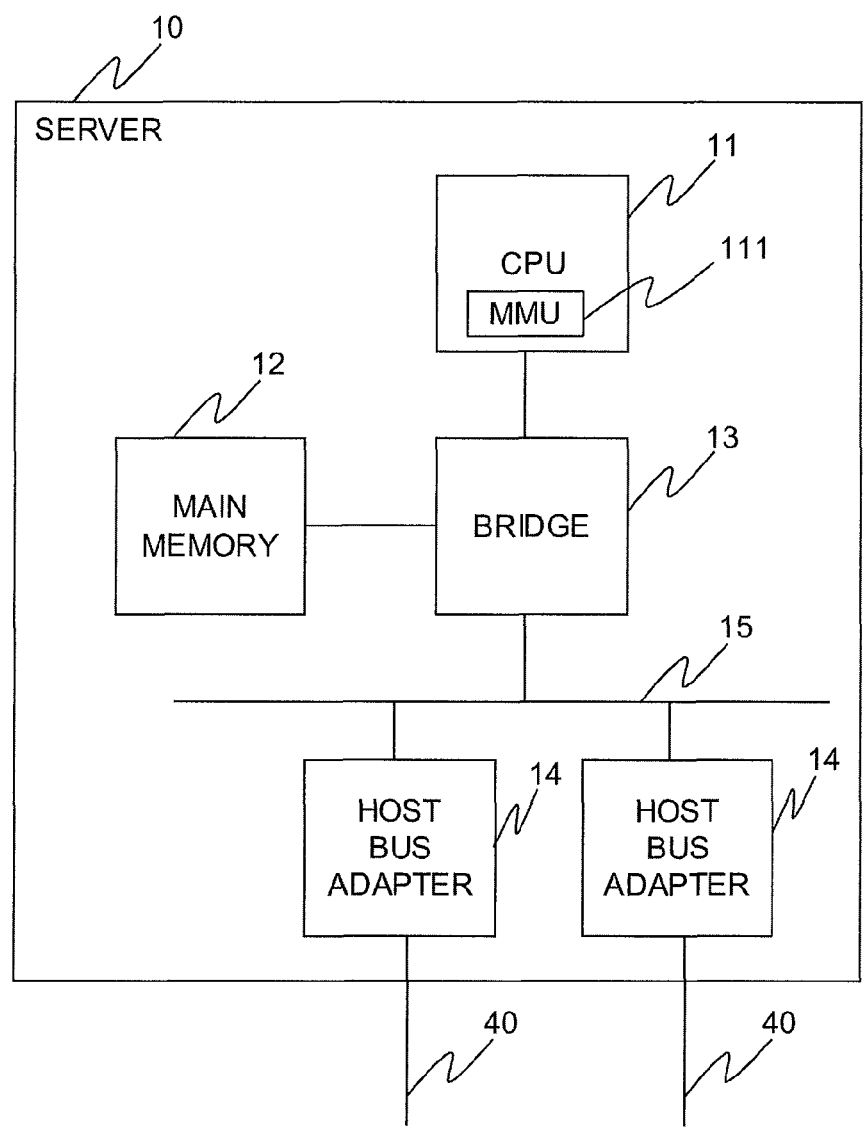
FIG. 2 is a block diagram that shows the detailed configuration of a server.

FIG. 2 is a block diagram that shows the detailed configuration of a server 10. The server 10 has a CPU 11, a main memory 12, and a bridge 13 that connects them. Furthermore, the bridge 13 is connected to host bus adaptors 14 through a bus 15 such as a PCI bus. The CPU 11 accesses programs stored in the main memory 12 and executes the processing accordingly. The main memory 12 stores various data in addition to programs.

The bridge 13 receives the access from the CPU 11, and additionally determines the access destination. If the access destination is a main memory area, [the bridge 13] controls the main memory 12 and allows the CPU 11 to access relevant data. If the access destination is the area of an I/O device, access is made through the bus 15. For example, in accessing a storage system 20 through a channel 40, it accesses the register and the embedded memory of the host bus adaptor 14 connected through the bus 15, and gives instructions for sending and receiving data to and from the storage system 20.

In addition, the MMU 111 that manages the virtual memory is operated in executing virtual memory processing. If the area to which the CPU 10 makes access is not stored in the physical memory but in the virtual memory area of the storage, the MMU 111 reports this to the OS through an exception report or the like. In the exception processing, the contents of an area of the physical memory is written into the virtual memory area through the host bus adaptor, and the intended area of the virtual memory is read into the physical memory. This operation is called a swap. Next, the operation of the virtual memory processing is described by referring to FIG. 4 and FIG. 5, though for simplifying the description, the storage control system is assumed to have one channel, and the storage is assumed to be one HDD (FIG. 3).

Figure 3:
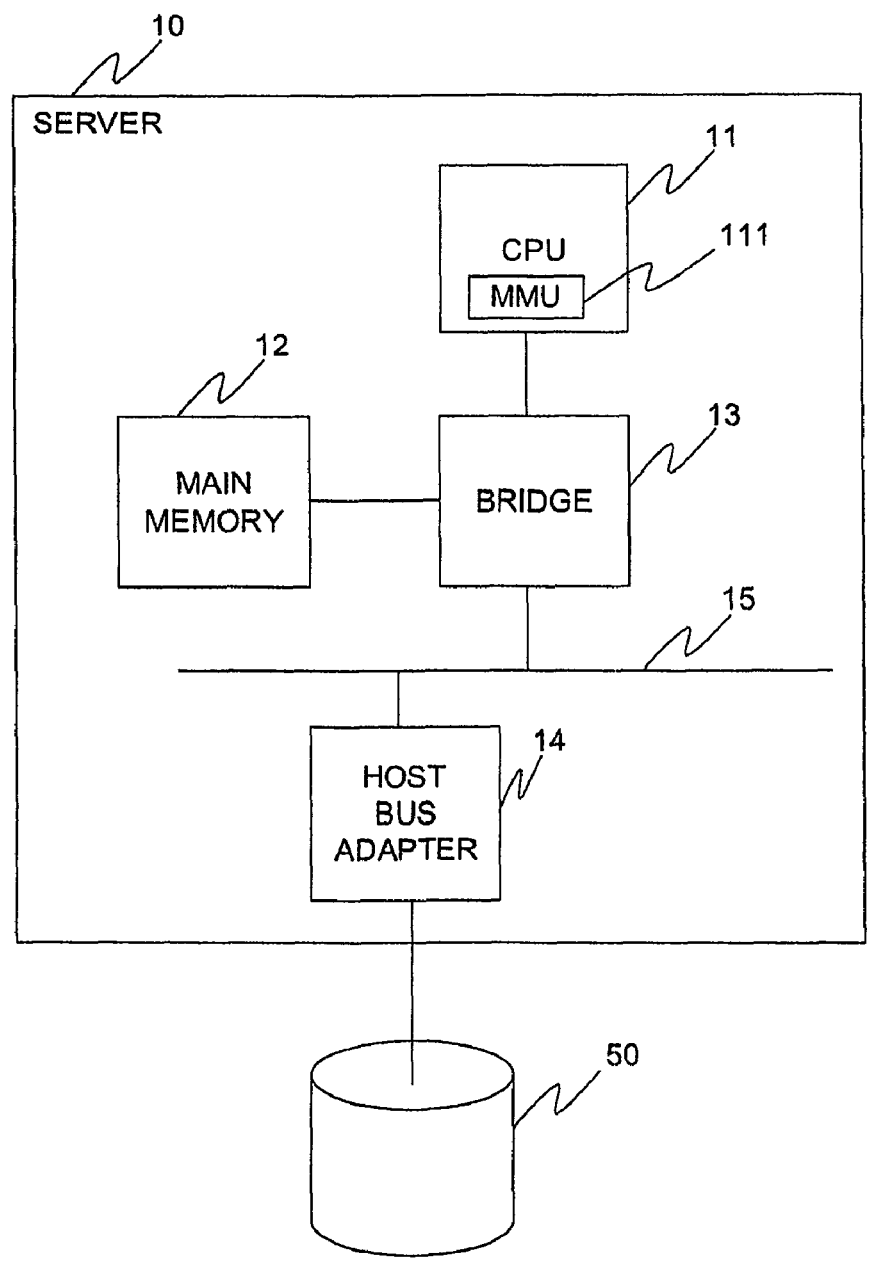
FIG. 3 is a block diagram that simplifies the system configuration.
Figure 4:
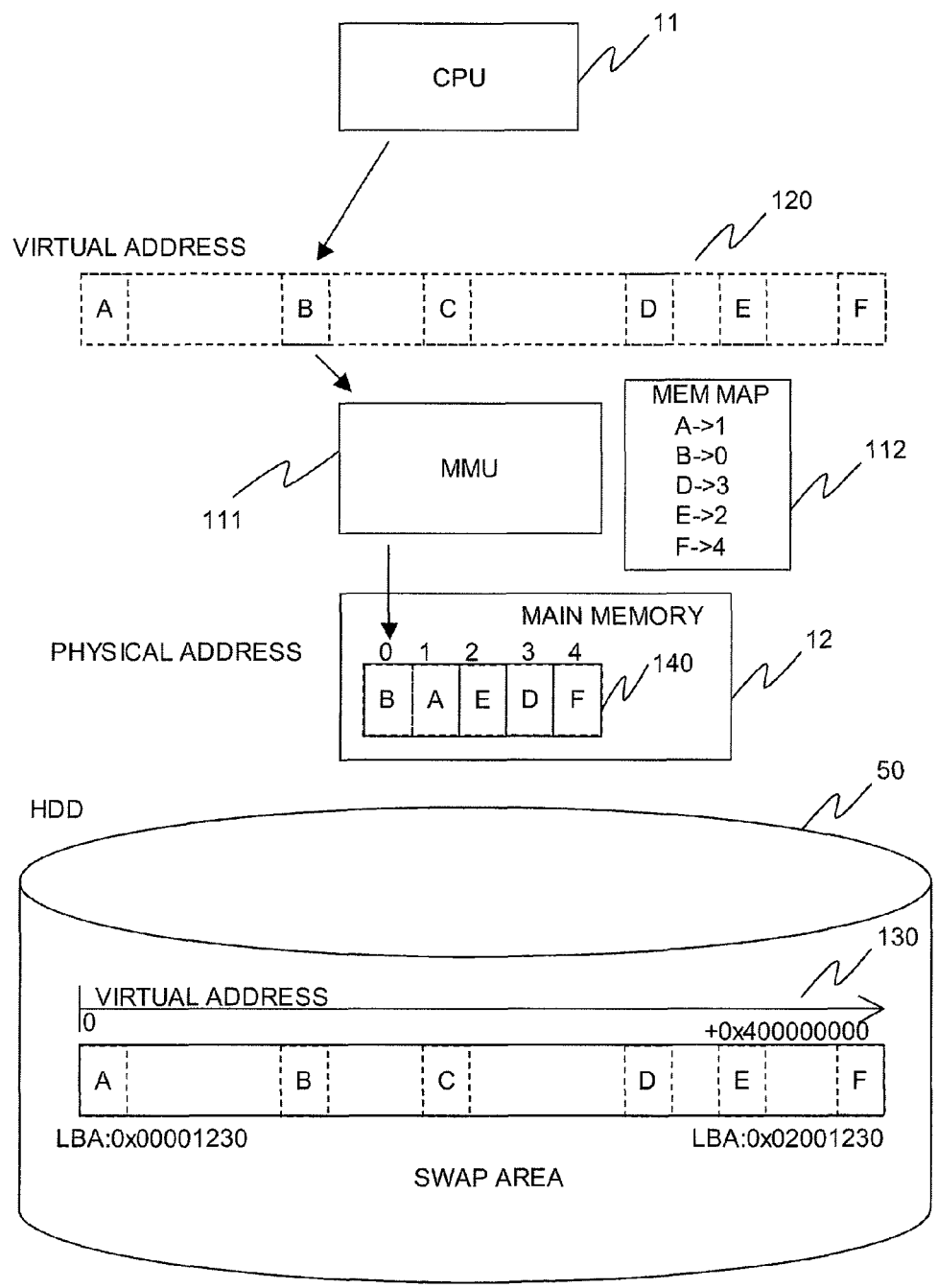
FIG. 4 is a block diagram that describes the data processing using a virtual memory of the storage control system.

FIG. 4 is a block diagram that describes the virtual memory processing in the system shown in FIG. 3. If the CPU 11 accessed the memory space, the CPU 11 specifies the addresses of a virtual address space 120. The MMU 111 refers to the memory map 112 installed in the MMU 111, and checks its actual storage destination. The memory map 112 records the correspondence of the physical addresses that show the storage destinations of the main memory 12 and the virtual addresses allocated to them. The MMU 111 obtains the physical address corresponding to the virtual address to which the CPU 111 is trying to access, specifies this physical address to the bridge 13, and accesses the main memory 12.

For example, if the CPU 11 accesses the data of the virtual address B, the MMU 111 receives the virtual address. Then the MMU 111 refers to the memory map 112, and confirms that the virtual address B corresponds to the physical address 0. Furthermore, [the MMU 111] accesses the address 0 of the main memory 12 through the bridge. Though this document refers to the addresses as A, B, 0 and 1 in the explanation, the actual administration is executed in the address area within a range, for example, from 0x010000 to 0x01ffff.

On the other hand, if the physical address that corresponds to the virtual address to which the CPU 11 is trying to access is not recorded in the memory map 112, the data corresponding to this virtual address is not stored in the main memory 112. In that case, the MMU 111 reports an exception to the CPU 11, and notifies that the relevant data is not stored in the main memory. Then the CPU 11 accesses the swap area 130 storing the entire virtual address space through the host bus adaptor.

Figure 5:
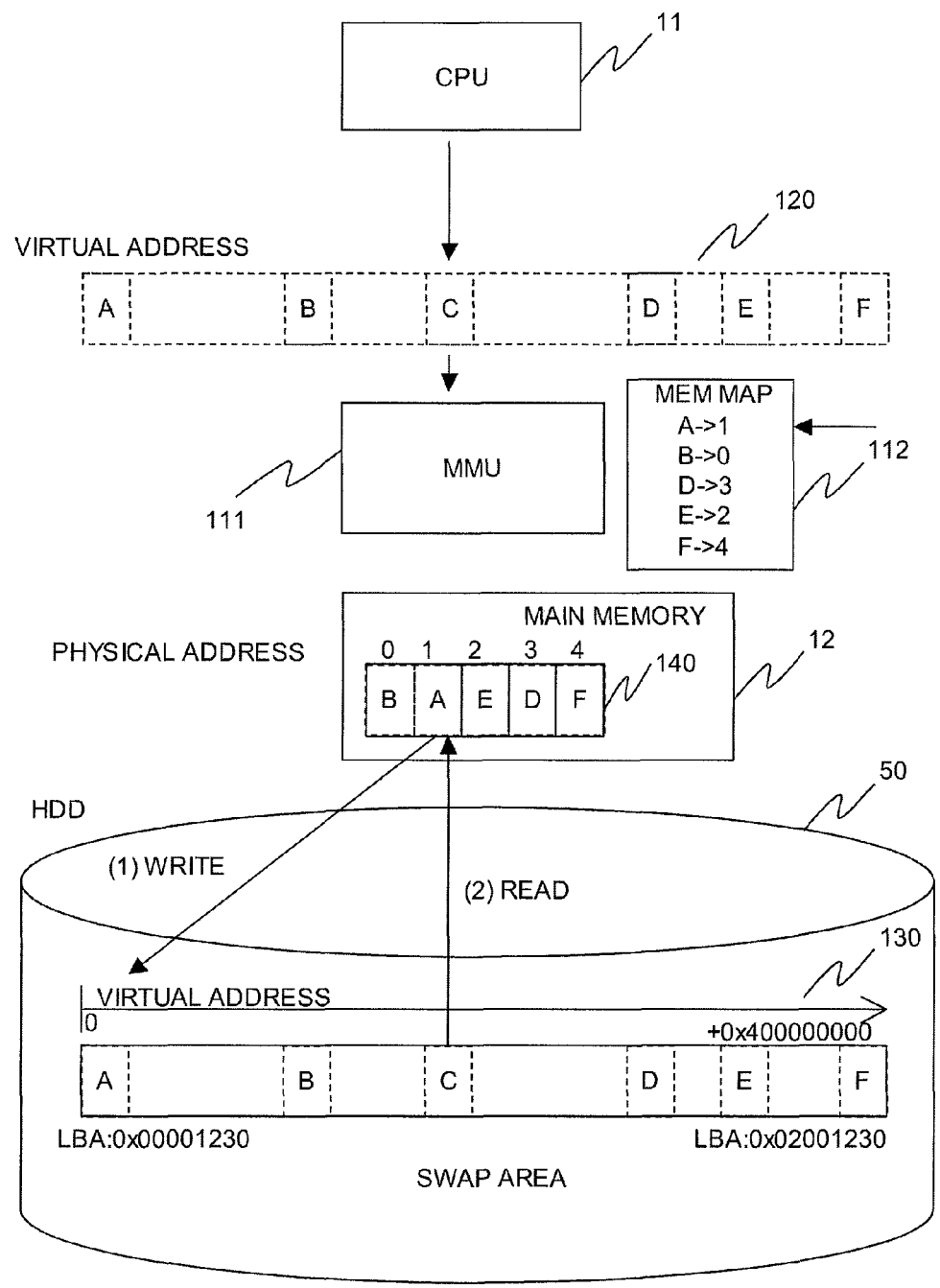
FIG. 5 is a block diagram that describes the swap processing in the virtual memory processing.

FIG. 5 is a block diagram that describes the swap processing in the virtual memory processing. While the description of FIG. 4 focused on the fact that the data of the virtual address required by the CPU 11 has been stored in the main memory 12, the case where the data of the virtual address is not stored in the main memory 12 is described below. If the CPU 11 accesses the data of the virtual address C, the MMU 111 receives the virtual address C. Then the MMU 111 refers to the memory map 112 and searches for the physical address corresponding to the virtual address C.

However, in this case, the relevant correspondence does not exist in the memory map 112. In that case, the MMU 111 reports an exception to the CPU 11. The CPU 11 that received the exception report refers to the memory map 112, and, among the areas where data is stored in the main memory 12 currently and the physical addresses are allocated, selects the area to which the relevant data is to be allocated to the swap area 130.

In this case, if the memory map 112 has the function of displaying the access order of the areas, it is better to select the area to which the last access was made the earliest. Here, it is assumed that the virtual address area "A" allocated to the physical address "1" is selected. In that case, firstly, the CPU 11 gives the host bus adaptor 14 an instruction to store the contents of the physical address "1" of the main memory 12 in the area with the address that is the virtual address "A" added to the head address of the swap area. The CPU 11, on receiving a completion report from the host adaptor 14, then gives the host bus adaptor 14 an instruction to store the data of the area with the address that is the virtual address "C" to be accessed this time added to the head address of the swap area in the physical address "1" from which the original data has been stored in the storage through the previous processing. The CPU 11, on receiving a completion report from the host adaptor 14, converts "A→1" of the memory map 112 into "C→1," which means that the swap is completed. As in the contents of the changed memory map 112, by accessing the data of the physical address "1" of the main memory 12 corresponding to the virtual address "C," the CPU 11 can continue the program processing.

Due to the above-mentioned operation, from the perspective of the storage system that is the storage destination, the swap area is different in its usage from general application programs and ordinary data. For example, the application program data is not rewritten after it is read from the storage to the memory. However, the memory data of ordinary data is rewritten after it is read from the storage to the memory, and the data which is partly rewritten later is often stored in the storage. Except for high-transaction applications such as a database, to an area, only one of either read or write tends to be executed. On the other hand, in swap areas of a virtual memory, write tends to be executed after read is executed to an area.

Furthermore, those areas are different from the perspective of applications. Generally, if an application also executes record or read, such processing is designed as taking longer than other types of processing. For example, it proposes the "Save" menu to the user, and receives the instruction by the timing in which speed deterioration is acceptable to the user. In addition, applications with the periodical automatic save function also allow the user to specify the frequency, and they receive instructions regarding the degree of acceptable speed deterioration. However, if the virtual memory is used, even the access which is designed by the application to be the access to the memory might become the access to the storage system that takes significantly longer time. That is, it is a delay unexpected by the application designer, and it might affect the user operability. Therefore, compared with the access to general applications and data, faster access to swap areas is highly needed.

Figure 6A:
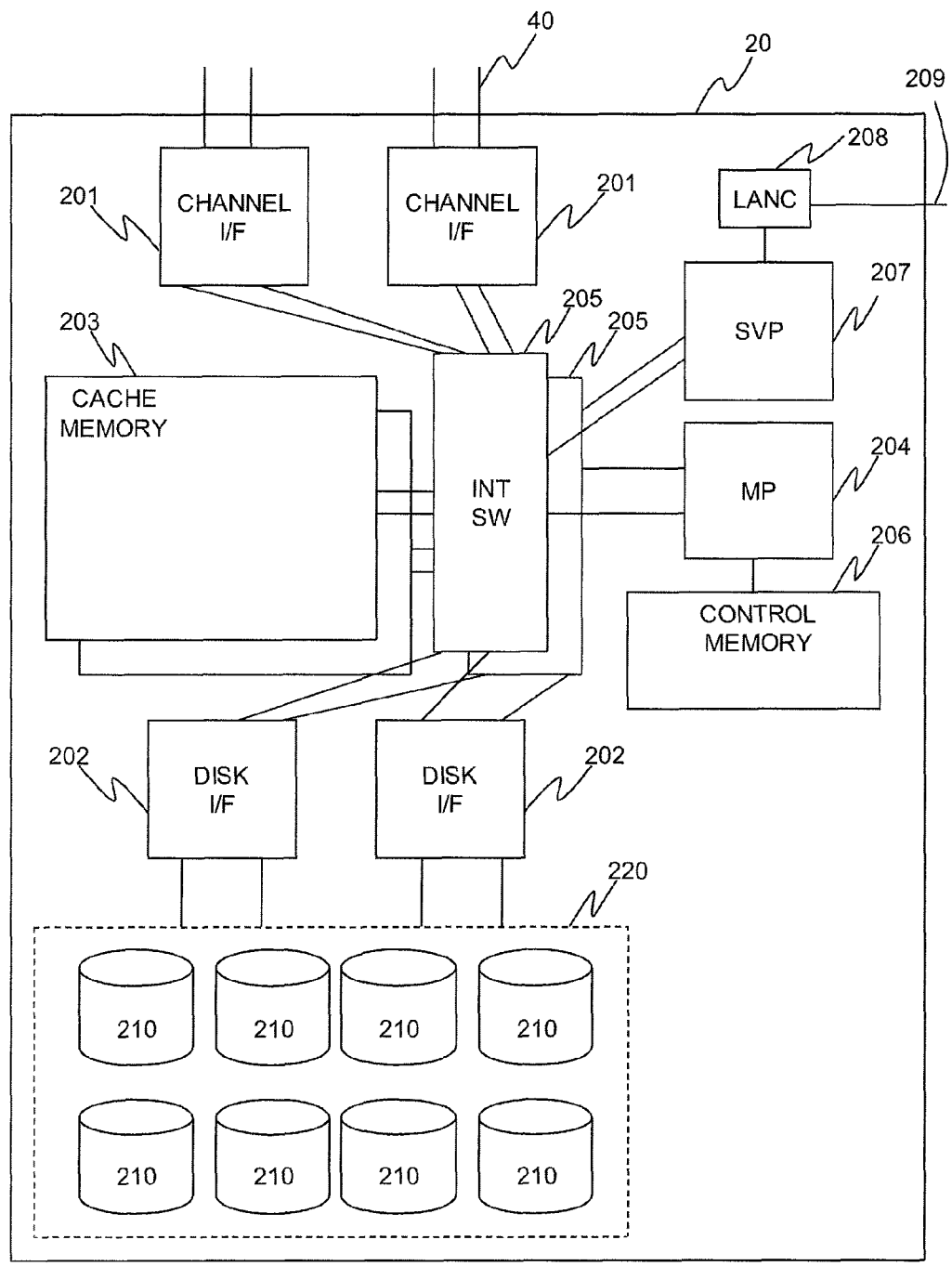
FIG. 6A is a block diagram that shows the configuration of a storage system related to this invention.

FIG. 6A is a block diagram that shows the configuration of a storage system 20 of this invention. The storage system 20 is comprised of channel interfaces 201 which provide the servers 10 with the channels 40 and communicate with the inside of the storage system, disk interfaces 202 which control the backend network 220 comprised of multiple HDDs 210 that make up the second memory, a cache memory 203 that stores data temporarily and provides the access source with faster access than the HDDs 210, and an MP 204 for instructing the collaboration of the foregoing components are connected to one another by internal switches 205.

The MP 204 is coupled to the control memory 206. The control memory 206 stores various programs, configuration information, control data, and so on as illustrated in detail in FIG. 6B. In addition, as the final data storage destination, multiple HDDs 210 connected by the backend network 220 are installed in the storage system 20. The storage system 20 performs processing for showing multiple physical HDDs 210 virtually as a single storage area, and dividing and showing it as multiple areas. For example, this virtual storage area is a logical unit (LU). Furthermore, [the storage system 20] executes the RAID (Redundant Arrays of Independent Disks) control to make the number of HDDs 210 redundant and increase the availability. A supervisor processor (SVP) 207 for providing the administrator with the administration function is also connected to the internal switches 205. Furthermore, if each component is duplicated for high availability or volatile memory is originally used for the speed-up of the cache memory, it can be made non-volatile by battery backup or other means. Note that reference numeral 208 refers to a LAN controller to connect the SVP to the administrative client through the LAN 209.

Figure 6B:
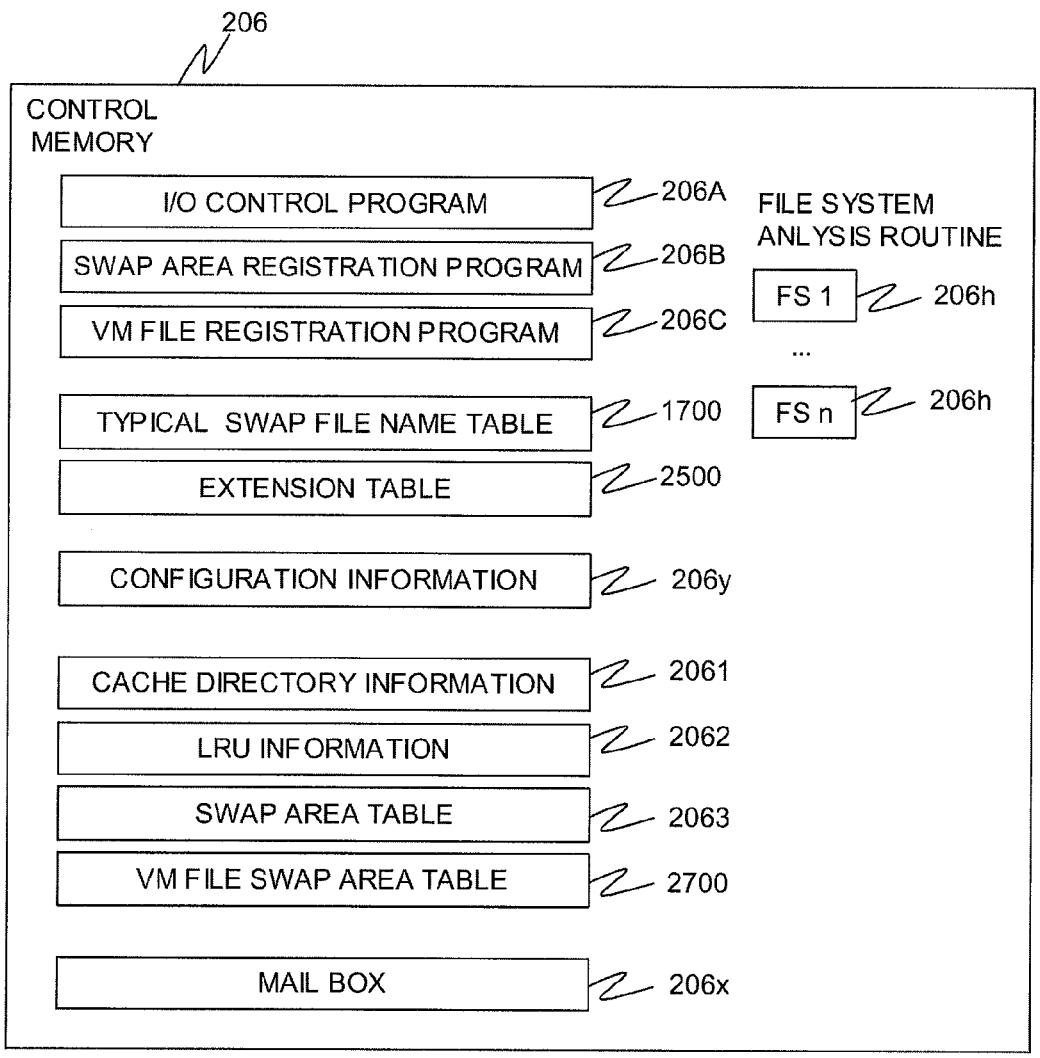
FIG. 6B is a block diagram of the control memory describing the control information to be stored in the control memory.

FIG. 6B is a block diagram that shows the information stored in the control memory 206. The control memory 206 stores the programs to be executed by the MP 204 and the data for its control. One of those is the I/O control program 206A that received the instruction for the method of processing basic I/O requests from the server 10. The [control memory 206] additionally stores the cache directory information 2061 that is required for processing the I/O control program 206A and the LRU information 2062 to show the order access to the slot which is the administration unit of each cache.

[The control memory 206] also stores the swap area registration program 206B (details shown in FIG. 16), the VM file registration program 206C (details shown in FIG. 23), and the file system analysis routine 206h that analyzes each file system, as well as a swap area table 2063 and a VM file swap area table 2700 used by those programs. Furthermore, [the control memory 206] additionally stores the mail box area 206x for communicating with each part in the storage system 20.

As for the mail box area 206x, if a channel interface or a disk interface needs to transmit a message, the issuer of the message writes the message in the area of the mail box that has been specified in advance. The MP 204 refers to the mail box area periodically and, if there are any messages, processes the messages. Thus, even if a large number of I/O requests occur and the processing with high multiplicity needs to be executed, I/O processing is possible.

If there is no response to the I/O request in an extremely long time, the server considers the situation as an error. Therefore, if many requests arrive at almost the same time and they are processed sequentially, compared with the first one to arrive by a narrow margin, the x-th one to arrive by a narrow margin appears to take x times as long in terms of processing time. Therefore, the MP 204 suspends the processing of each message at an early stage sequentially so that it will process all the messages that are posted. Thus the latency and the service time of the messages can be averaged. How they process the I/O requests from the server 10 is described below.

Figure 7:
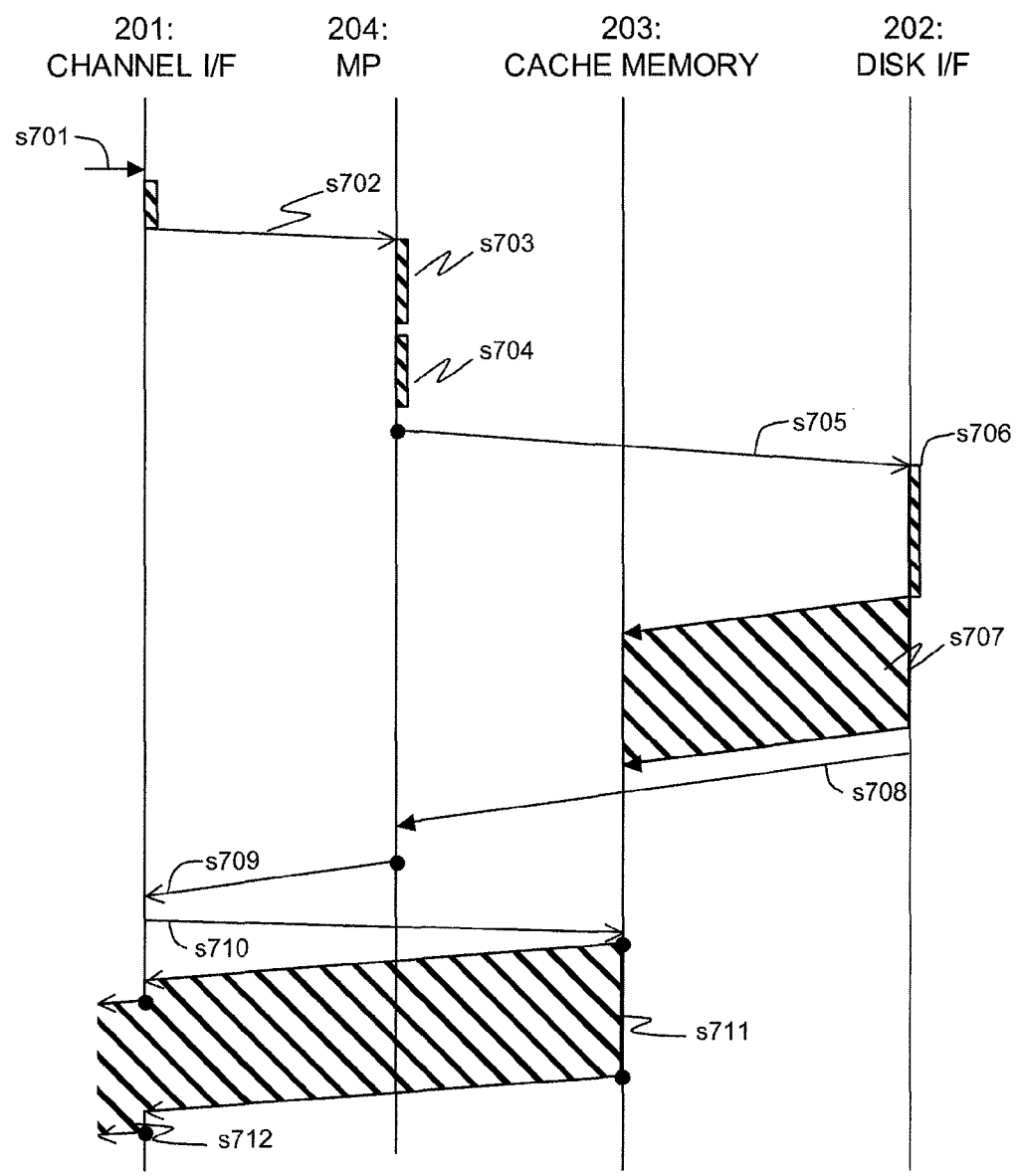
FIG. 7 is a ladder chart describing the operation of a storage system which received a read I/O request from the server.

FIG. 7 is a ladder chart describing the processing of a storage system which received a read I/O request from the server 10. The channel interface 201 receives the read I/O request from the server 10 through the channel 40 (s701).

The channel interface 201 reports the contents of the received I/O request to the MP 204 (s702). In that process, the mail box area in the control memory 206 is used. The MP 204 analyzes the I/O request received from the message, and obtains the access type, the logical unit number (LUN) that is the identifier to identify the access target, and the logical block address (LBA). In addition, by using the cache directory information, it determines whether the relevant data is already stored in the cache memory 203 (s703).

This description assumes that the relevant data is not in the cache memory 203 but stored only in an HDD 210. Next, the disk interface 202 transfers the relevant data to the cache memory 203 (staging). Prior to that, if no space is left in the cache memory 203, the area to store the data must be saved in the cache memory. Which area to create free space is determined by the LRU information and the processing of FIG. 15 to be described later, and the status is reflected in the control memory (s704).

After the cache memory area is saved, a staging request including the relevant HDD address and the address of the cache memory that is the transfer target are sent to the disk interface 202 (s705). Note that the channel interface 201 and the disk interface 202 collaborate in this method because the time that data can be obtained from HDDs is not steady and longer than the other processing time, and this method enables the processing of other requests in the background. The disk interface 202 which recognized the staging request controls the HDD 210 through the backend network 220 so that the relevant data will be available (s706).

Once the data is obtained from the HDD 210, the relevant data is written in the area saved through s704 (s707, staging). The completion of the staging is also reported to the MP 204 (s708). The MP 204 gives an instruction to the channel interface 201 for responding to the server 10, along with the information such as which I/O request is replied to and in which area of the cache memory the relevant data exists (s709). The channel interface 201 reads the relevant data from the cache memory 203, and transfers it to the server 10 (s710, s711 and s712). This is the entire process of reading the data stored in the HDD 210. Since the speed of the HDD 210 is unsteady and slow, the disk interface 202 must also be controlled independently. In addition, the response to the server 10 does not exceed the response rate of the HD 210.

Figure 8:
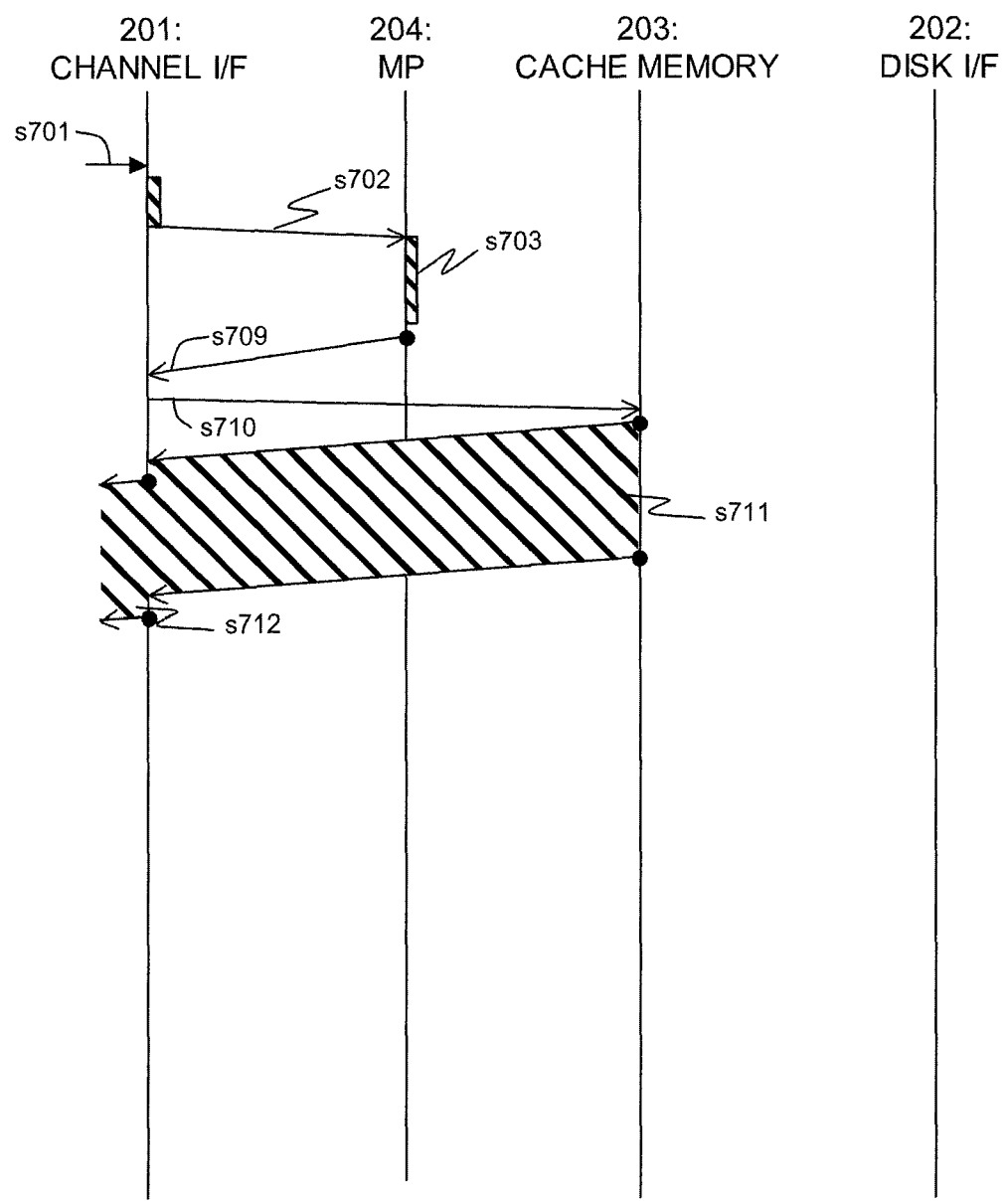
FIG. 8 is a ladder chart describing the operation of a storage system which received a read I/O request from the server, in cases where there is cache memory data.

FIG. 8 is a ladder chart describing the processing of a storage system which received a read I/O request from a server 10, in cases where the relevant data is in the cache memory. At the step of s703 in FIG. 7, if it is determined that the relevant data is in the cache memory 203, it is not necessary to save another area in the cache memory or control an HDD 210 through the disk interface 202. That is, the processing from s704 to s708 is not executed. Therefore, the response rate to the server 10 is not limited by the response rate of the HDD 210. For example, supposing that the response rate is 5 millimeters per second and the processing in FIG. 8 takes 50 microseconds, the response rate can be improved by more than 100 times compared with the case of FIG. 7.

Figure 9:
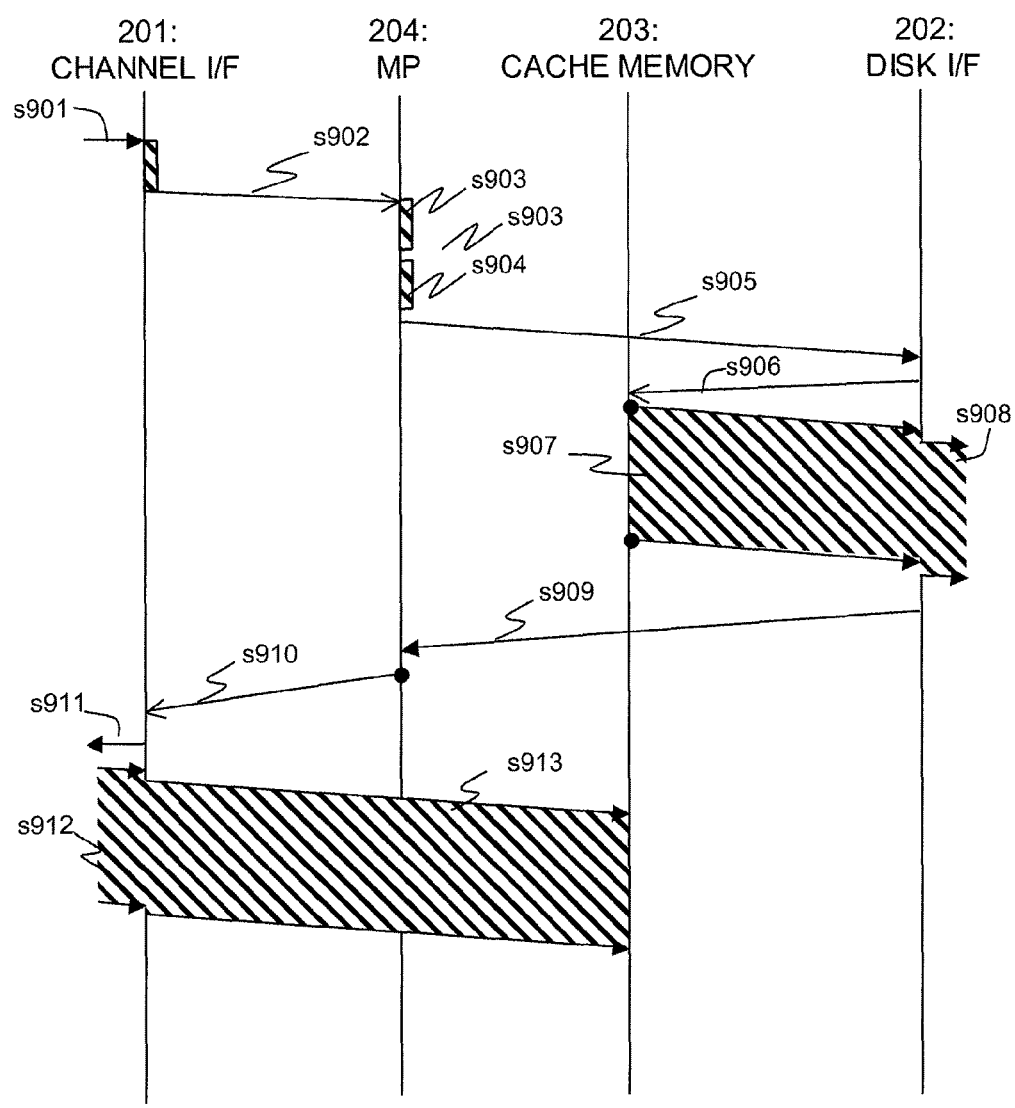
FIG. 9 is a ladder chart describing the operation of a storage system which received a write I/O request from the server.

FIG. 9 is a ladder chart describing the processing of a storage system which received a write I/O request from a server 10. The channel interface 201 receives a write I/O request from the server 10 through the channel 40 (s901). The channel interface 201 reports the contents of the received I/O request to the MP 204 (s902). The MP 204 analyzes the I/O request received from the message, and obtains the access type, the LUN and the LBA. In addition, by using the cache directory information, it determines whether the relevant data is already stored in the cache memory 203 (s903).

This description assumes that the data before rewriting is not in the cache memory 203 and no area is available for storing new data in the cache memory 203. The channel interface 201 transfers the write data of the server 10 to the cache memory 203, but prior to that, if no space is left in the cache memory 203, the area to store the data must be saved in the cache memory.

In this case, the data previously written into the cache memory 203 is written into an HDD 210 through the disk interface 202 (destaging). The LRU information and Fig. x described later are used to decide the data of which area is to be written into the HDD 210 and whether to make this cache memory area an unused area (s904). A destaging request including the address of the cache memory address as a transfer source and the relevant HDD address is sent to the disk interface 202 (s905).

The disk interface 202 which recognized the staging request reads the relevant data from the cache memory (s906 and s907), and controls the HDD 210 through the backend network 220 so that the relevant data will be written (s908). Once the writing of data into the HDD 210 is completed, the completion of the destaging is reported to the MP 204 (s909). The MP 204 gives an instruction to the channel interface 201 for storing the data from the server 10 in the cache memory area along with the information such as which I/O request is replied to and to which area of the cache memory the relevant data should be stores (s910). The channel interface 201 sends the message that it is ready to receive data (s911).

Accordingly, the server 10 sends write data (s912). The channel interface 201 which received the write data writes it into the cache memory area according to the instruction received from the MP 204. This is the entire write processing where the data before rewriting is not in the cache memory 203 and no area is available for storing new data in the cache memory 203. If the cache memory area is not sufficient though it is write processing, the response rate to the server 10 is limited by the response rate of the HDD 210.

Figure 10:
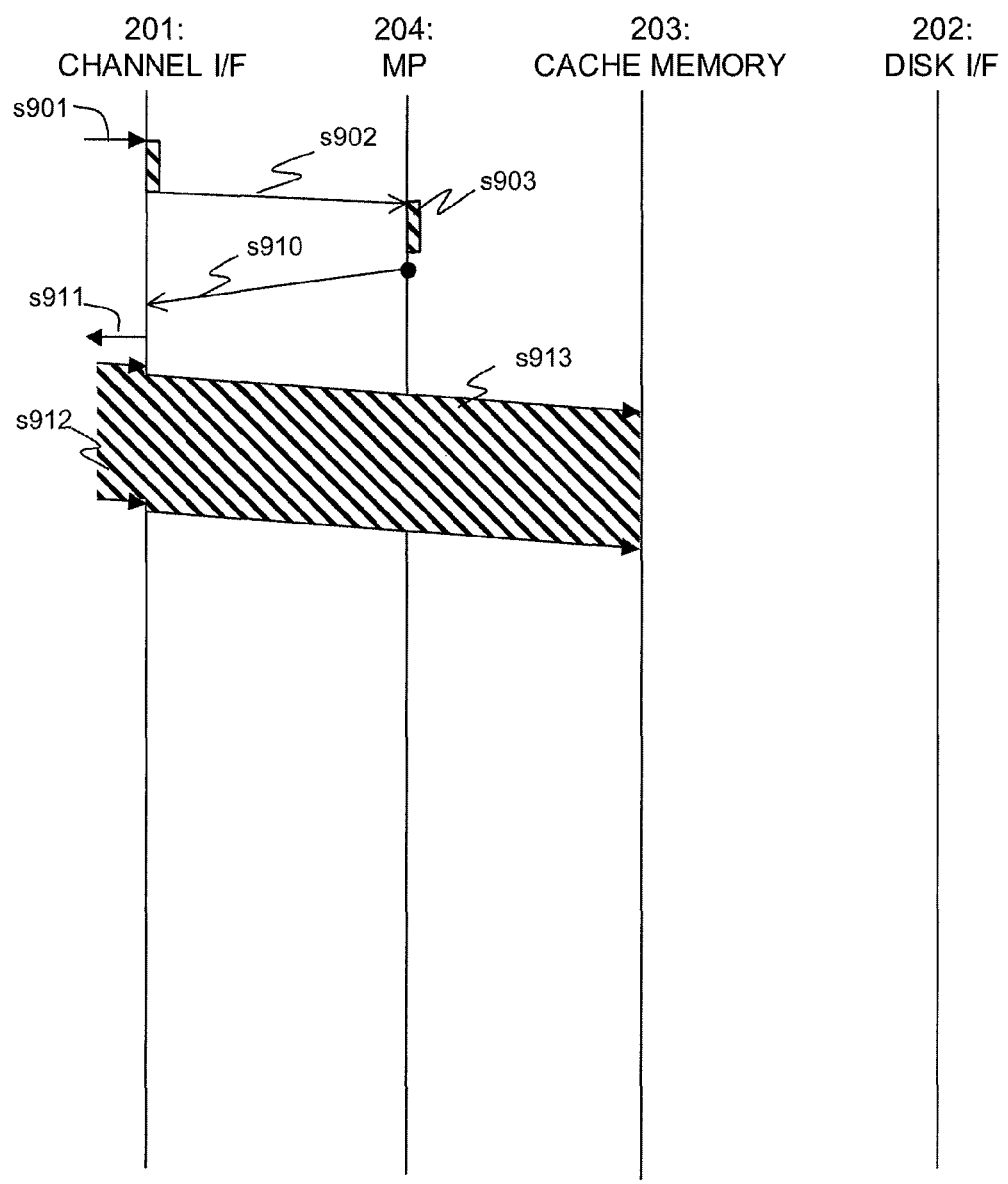
FIG. 10 is a ladder chart describing the operation of a storage system which received a write I/O request from the server, in cases where there is cache memory data.

FIG. 10 is a ladder chart describing the processing of a storage system which received a write I/O request from the server 10 when the data before rewriting is in the cache memory 203. If it is determined at s903 of FIG. 9 that the data before rewriting is in the cache memory 203, the area can be overwritten. Therefore, it is not necessary to save new area in the cache memory or control an HDD 210 through the disk interface 202. That is, the processing from s904 to s909 is not executed. Therefore, the response to the server 10 is not limited by the response rate of the HDD 210, and it is expected that the write speed will also be significantly improved by more than 100 times compared with the case of FIG. 7.

Figure 11:
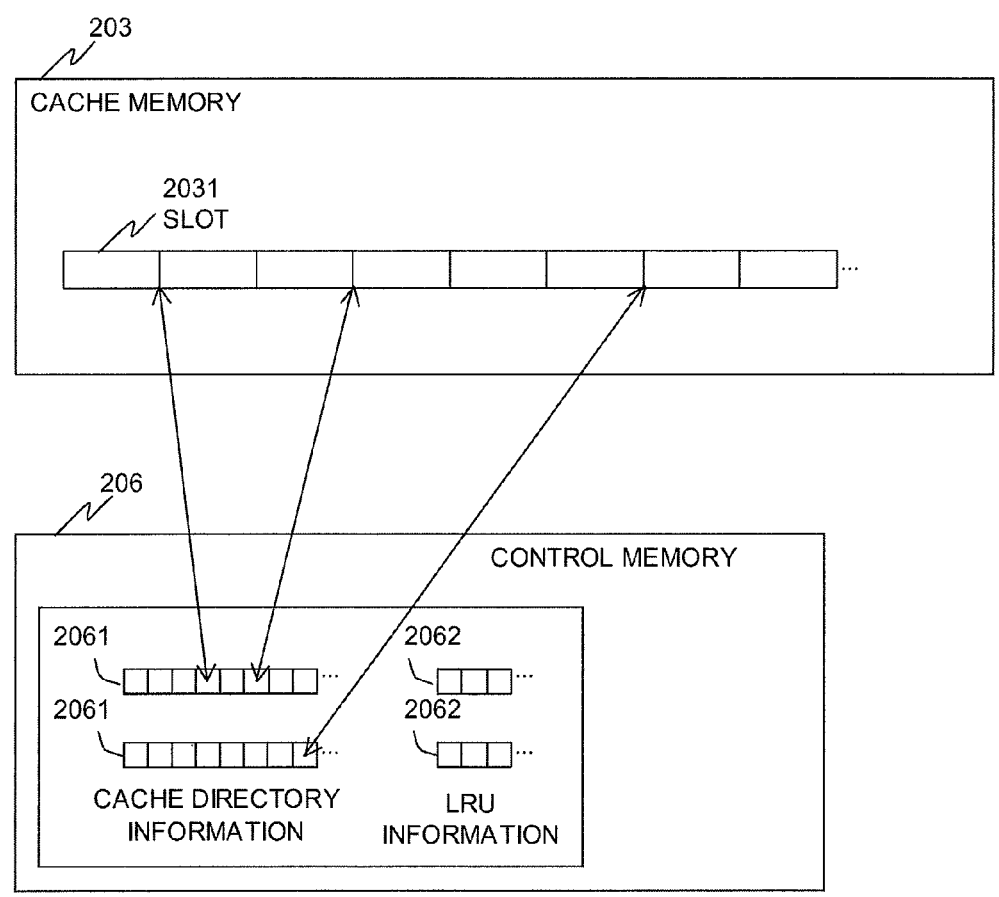
FIG. 11 is a block diagram that shows the relation of cache directory information and LRU information to a cache memory area.

FIG. 11 is a block diagram that shows the relation of cache directory information and LRU information to a cache memory area. The cache memory is divided into slots 2031 as administration units. The cache directory information 2061 indicates which LU and LBA each slot 2031 is allocated to. In addition, the LRU information 2062 is the information as for which slot is to be invalidated in staging and destaging. It is also administrated in increments of a slot 2031. The size of a slot 2031 is, for example, 64 kilobytes. As the slot is smaller, the degree of freedom in allocation is higher, and logically, the efficiency is improved. However, for a certain cache memory capacity, if the slot size is smaller, the number of slots becomes larger. Therefore, the cache directory information and the LRU information required for the administration becomes larger in size.

Figure 12:
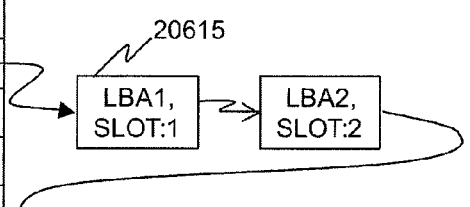
FIG. 12 is a block diagram that shows the details of cache directory information.
Figure 12:
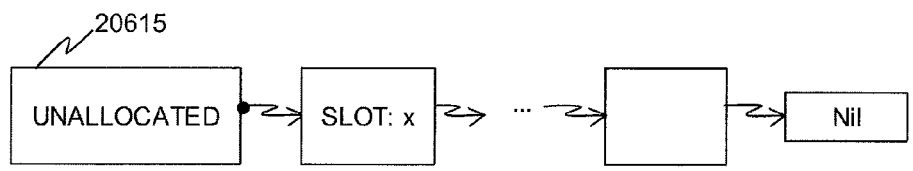

FIG. 12 is a block diagram that shows the details of the cache directory information. The cache directory information, in detail, has the data configuration as follows, and for faster search, LU numbers and LBAs can be searched. The cache directory head table 20611 records the pointers for the LBA table 20612 that enable the search for the LBA that corresponds to each LU. The LBA table 20612 has the LBA column 20613 and its corresponding RAID group column 20614, and the pointer for the slot list 20615. The LBA column 20613 indicates the ranges of LBAs, and those ranges are to be eventually stored in the HDDs 210 that comprise the RAID group with the number indicated by the RAID group column 20614. Furthermore, the LBA-slot list 20615 pointed by the pointer keeps the area allocated to the cache memory from the LBA range in the data configuration shown as a list.

To execute s703 of FIG. 7 or s903 of FIG. 9, the range is specified first by the LBA column 20613, then the LBA-slot list 20615 is searched, and the matching is checked by comparing the "LBA" in the list and the LBA request from the server 10. If no match is found to the NIL that indicates the end of the list, it means that the relevant data is not in the cache memory. If there are any matches, the relevant data should be in the cache memory slot stated in the "SLOT" part of that list. Currently unallocated slots are entered in the unallocated slot list 20615. Thus, if new allocation to cache memory areas becomes necessary, the allocation target can be determined immediately.

Figure 13:
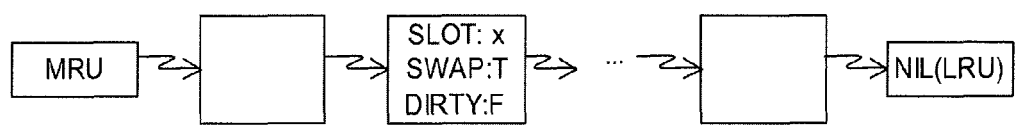
FIG. 13 is a block diagram that shows the details of LRU directory information.

FIG. 13 is a block diagram that shows the details of LRU information. The LRU information 2062 is in the order starting with the most recently used slot, sequentially, to the least recently used slot. If another cache memory area must be allocated to an LBA, which slot to invalidate can be determined according to the information.

The components in the list state the information of the slot number, the swap area flag and the dirty flag. The dirty flag indicates whether there has been any write, and if it indicates true, that means the relevant slot data is different from the data of the HDD 210. In addition, the swap area flag indicates that this slot is allocated to the swap area. Basically, if there is any access to a cache slot and if it has been an unallocated area, this list adds the access at the top by the INSERT operation. In addition, if an LBA is already allocated to the slot, the DELETE operation is executed to the component of the relevant slot temporarily, and then the INSERT operation is executed to newly add it to the top of the list.

If the access is write, the dirty flag is set to true. Thus the access order can be controlled. However, the procedure of FIG. 15 described later is performed so that the swap area will not be invalidated.

Figure 14:
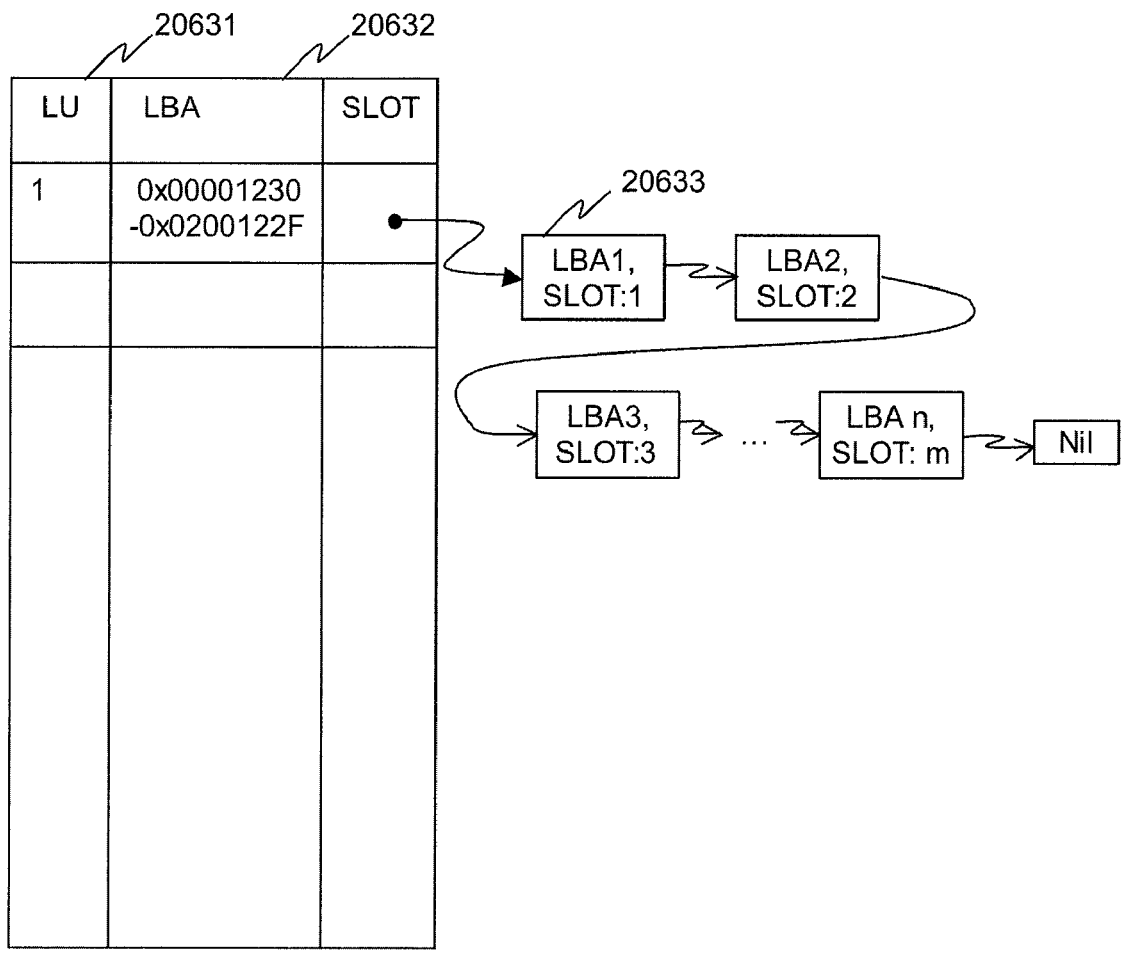
FIG. 14 is a block diagram that shows the details of a swap area table.

FIG. 14 is a block diagram that shows the details of a swap area table. The swap area table 2063 has the LU column 20631, the LBA column 20632, and the pointer for the slot list 20633. This table indicates that the area that matches the LU column 20631 and the LBA column 20632 is used by the server 10. And in the swap area LBA-slot list 20633 pointed by the pointer indicates to which slot of the cache memory the area is allocated. These are created through the processing to be described later. They are also referred to in the LRU processing. By this table, through arranging the configuration of the LRU, this invention becomes effective. On the other hand, if the entire swap area cannot be allocated due to the size of the cache memory, limiting the size of the swap area LBA-slot list 20633 increases the priority of allocating the swap area to the cache memory compared with the other areas. Meanwhile, if the size of the swap area LBA-slot list 20633 is limited, this will lead to allocating that limited capacity to the swap area only. In that case, the cache memory area to allocate the other areas than the swap relatively increases, and the degree of freedom can be given to the setting of the service level.

Figure 15:
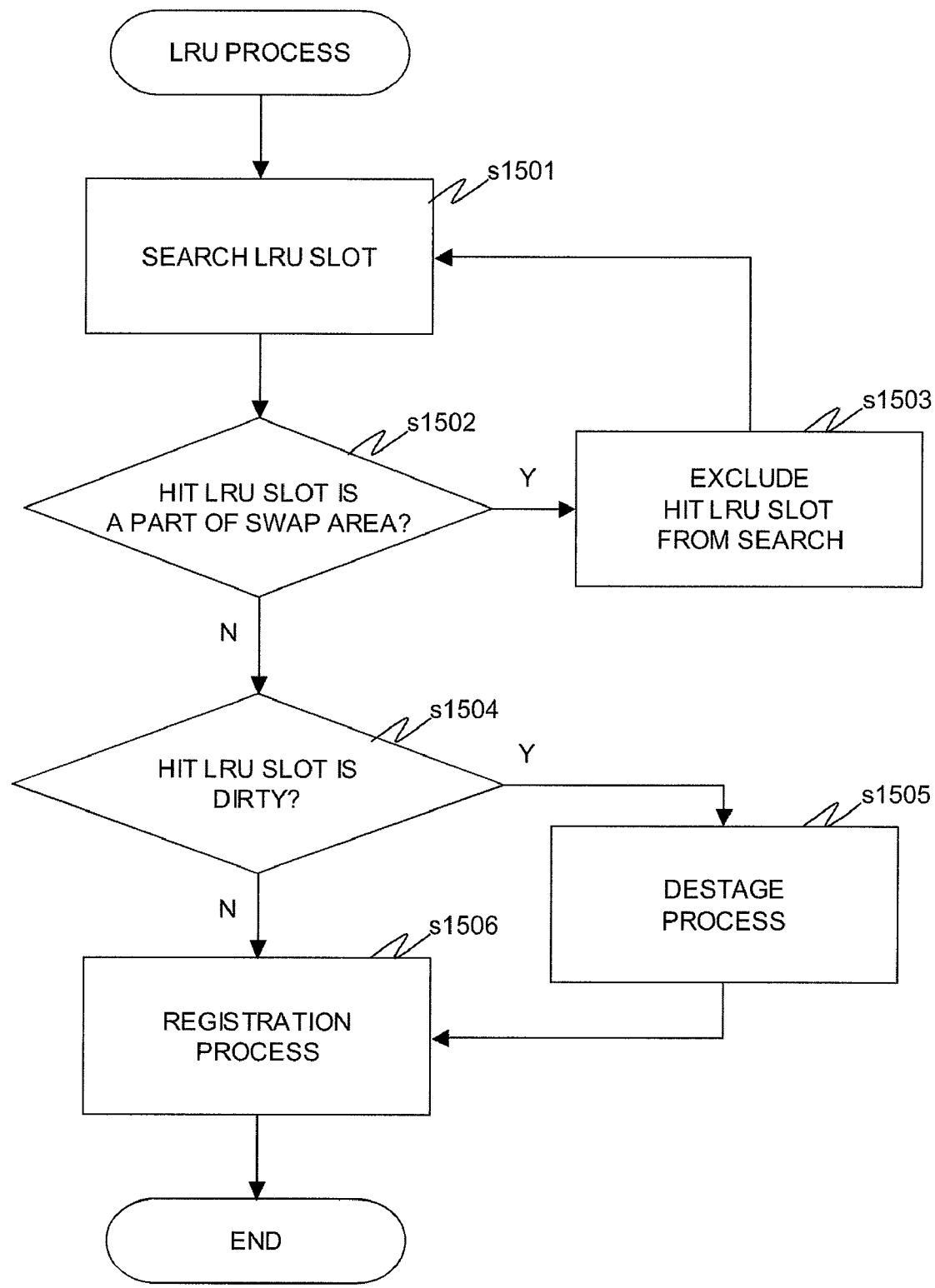
FIG. 15 is a flowchart that describes the details of the LRU processing.

FIG. 15 is a flowchart that describes the details of the LRU processing. That is the processing s704 in FIG. 7 and s904 in FIG. 9 executed by the MP 204, which determines which area (slot) to invalidate for a new allocation. The figure illustrates that process. Firstly, this processing searches the LRU 2062 list, and finds the least recently used slot. When this processing is executed at first, this slot is at the end of the list (s1501). Whether that slot is allocated to the swap area is determined. That is possible by referring to the swap flag of the list. Otherwise, that LBA can be compared with the LBA column 20632 (s1502).

If it is true that the slot is allocated to the swap area, that slot is to be excluded from this search. In this data configuration, the search goes to the previous slot in the list (s1503), and s1501 is repeated. That prevents the swap area from being invalidated by the cache memory, and the swap area is always allocated to the high-speed cache memory. If s1502 is not true, that is, if the slot is not allocated to the swap area, it is examined whether that slot has been rewritten by the write from the server 10. That can also be determined by the dirty flag of the LRU information (s1504). If it is true, the destaging processing from s905 to s909 in FIG. 9 is executed (s1505).

After the destaging processing or if the slot is not rewritten by the write, the relevant slot is deleted from the LRU information 2062 by the DELETE operation, and the information of the slot accessed this time is added to the top. In that case, if the access target this time is a swap area, the swap area flag is set to true, or false if not. If the access type is write, the dirty flag is set to true, or set to false if it is read (s1506), and the entire processing is over.

As for the access to the swap area, the above-mentioned processing makes the access target resident in the cache memory. That is, since the access to the swap area does not require another cache area, the high-speed response that skips the disk interface-related processing as in FIG. 8 and FIG. 10 can be executed. Note that, strictly, if all the slots have been allocated at the time of the first access to the swap area, the data in the general area must be invalidated and the access to the HDD is required, though it resides in the cache area from then on, and there is no actual influence.

Figure 16:
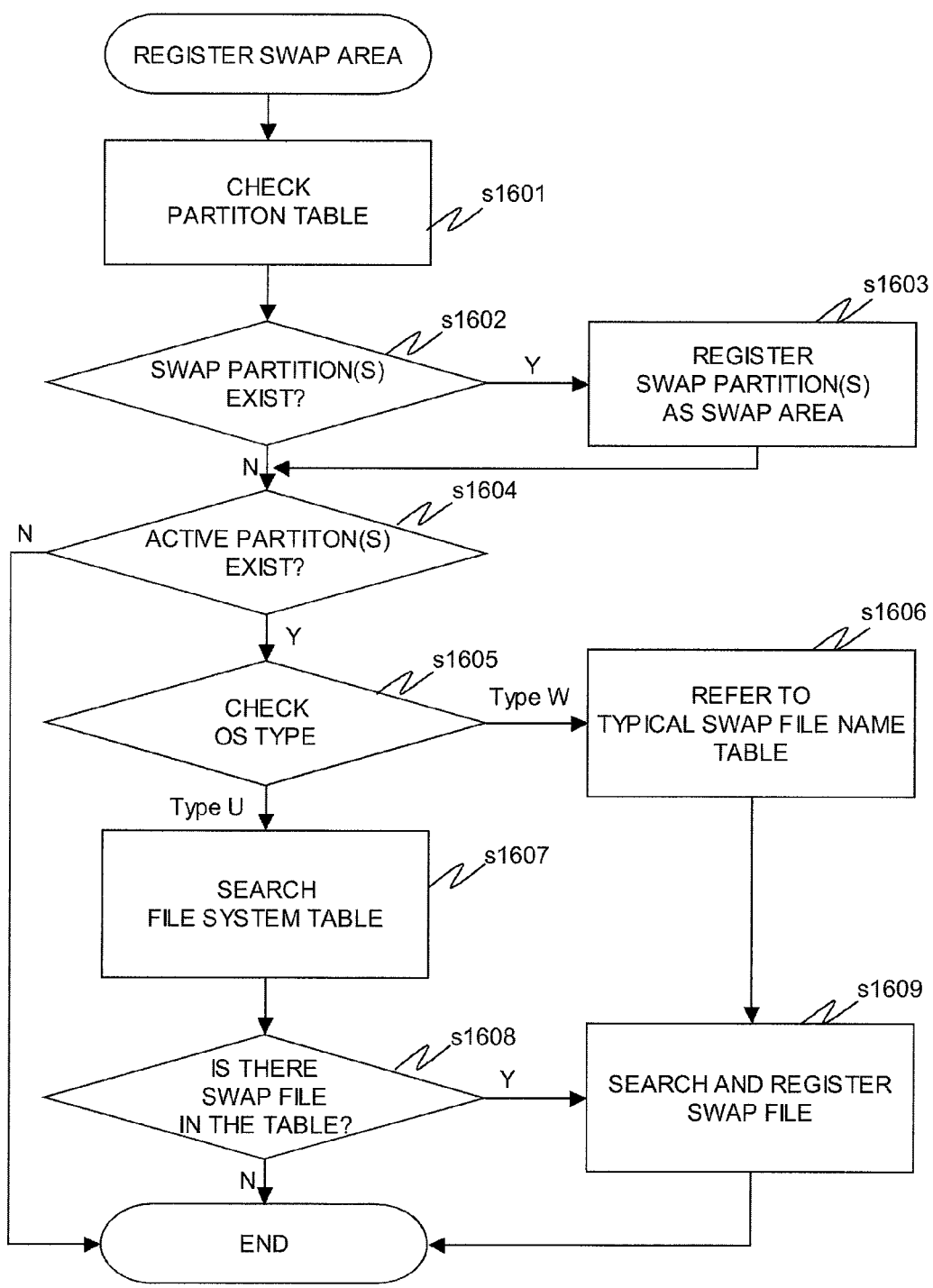
FIG. 16 is a flowchart that describes the processing of registering a swap area in the swap area table.

FIG. 16 is a flowchart that describes the processing of registering a swap area to the swap area table 2063 and so on. The MP executes the processing of FIG. 16 periodically or triggered by the instruction through SVP 207 from the administrator or the server. Note that, if the SVP 207 can access the control memory 206, the SVP 207 is allowed to execute the processing by itself. In addition, both the MP and the SVP are the processors of this invention.

This embodiment describes the case where the storage system 20 refers to the data stored in the secondary storage 220 and finds the swap area. In that case, it is necessary to control the disk interface 202 for accessing the stored data, but not necessary to receive any requests from the server 10 or respond to the server, and therefore the MP does not have to control the channel interface 201, which enables high-speed search in the swap area.

On the other hand, if search is to be executed from the server 10, it is required to execute the channel interface 201 related processing for the storage system 20, and besides, the actual operation might cause the timing when the storage system 20 is highly loaded to overlap with the processing for finding the swap area. It is because a storage system 20 is shared by multiple servers 10 and VMs, and generally, one server cannot find out the load status which another server 10 or the like is giving the storage system.

As for the storage system 20, it can execute the processing of finding the swap area in the timing that suits the load status. The load status can be measured, for example, by the amount of messages accumulated in the mail box 206x. It is because the number of messages are unprocessed or in processing increases when the load is high.

FIG. 16 describes the case with one LU, and if there are multiple LUs, this processing of FIG. 16 is repeated to all the LUs or the specified LUs.

Firstly, the MP 204 checks the partition table of the LU to be checked. The partition table is mostly recorded in the head block (Master Boot Record or MBR), and an example of the checking method is reading the head block of the LU as the checking target and see how many partitions there are and what types of partitions they are (s1601).

Next, it is checked whether there are any partitions of the swap partition type (s1602). If there is a swap partition, that entire swap partition is registered in the swap area table 2063 as a swap area. Concretely, the LU to be checked is recorded in the LU column 20631 and the LBA from the top to the end of the swap partition is recorded in the LBA column (s1603).

Subsequently, the relevant area is accessed, and if it is allocated to the cache memory area, the list is created on the pointer of this line. If the registration is over, or if there is no swap partition at s1602, whether there is an active partition where an OS to be booted is stored is checked (s1604). That is also mostly stated in the MBR. If there is no active partition, the check of this LU is over.

If there is an active partition, the type of the OS stored in that partition is determined. The type of partition helps determine what series of OS it is (s1605). The swap area can be identified by referring to the contents of a file at a specific position (s1606). The OS whose swap area is stated by a typical file name is classified as a "W type."

On the other hand, the OS where the file system to be mounted in booting is set in a specific file system table is classified as a "U type."

The search for a swap file is described below, but that process requires the ability to interpret the file system. Therefore, the type of this partition is checked, and the file system is analyzed by the file system analysis routine that suits the type of the file system that is used. If s1605 identifies the "W type," the typical swap file name table 1700 shown in FIG. 17 is referred to, and depending on the OS type, which file indicates the swap area is checked. For example, if the OS name is "W1," the area where the contents of the file "/pagefile.sys" are stored is considered to be a swap area. If the OS name is "O1," the file name of the swap file is stored in the file named "config.sys," and the area of that swap file is considered a swap file area. For example, if SWAP=swapper.dat is stated in the file config.sys, the area where the file contents of the file swapper.dat are stored is considered a swap file area. Then the processing proceeds to s1609.

In other cases, where s1605 determines that the OS is the "U type," firstly, the file system table file where the file system table is stored is searched. An example of a file system table file is /etc/fstab (s1607). Whether there are any statements that validate the swap file in the file system table stored in the file system table file is checked (s1608), and if not, the check of the LU is over. For example, so as to validate the file "a0.swp," "a0.swp swap" or the like is stated in the file system table. If such a statement exists, the area where that swap file is stored is considered to be a swap area, and the processing proceeds to s1609. s1609 registers the searched swap area to the swap area table 2063. That is, as executed in s1603, the LU as the checking target is registered in the LU column 20631 of the swap area table 2063, and the swap area where the contents of the swap file is stored is registered in the LBA column 20632.

Subsequently, the relevant area is accessed by the MP, and if the area storing the contents of the swap file is allocated to the cache memory area, the list is created on this pointer. Thus the swap area registration for one LU is over. This process is repeated as many times for the required LUs. If the swap area is saved as a swap file, it might not result in one serial area, but in such a case, this invention can be realized by allocating multiple lines (entries) of the swap area table 2063 to one swap file. Besides, by the processing for the relevant LU of optimizing the swap file so that the swap file will be allocated to a serial area, it can be allocated to one line (one entry) of the swap area table 2063.

FIG. 17 is a diagram that illustrates a typical swap file name table. A typical swap file name table 1700 has the OS name column 1701 and the swap area column 1702. The OS shown by the OS name column 1701 is, typically, the table that shows, in the swap area column 1702, with what file name to keep the swap area. In FIG. 17 of this document, the OS names "W1" and "W2" indicate that "/pagefile.sys" is the swap file. As for the OS name "O1," it indicates that the swap file is clearly stated in the file "config.sys." This table is set as factory default in advance, upon updating the software, or by the administrator.

Figure 18:
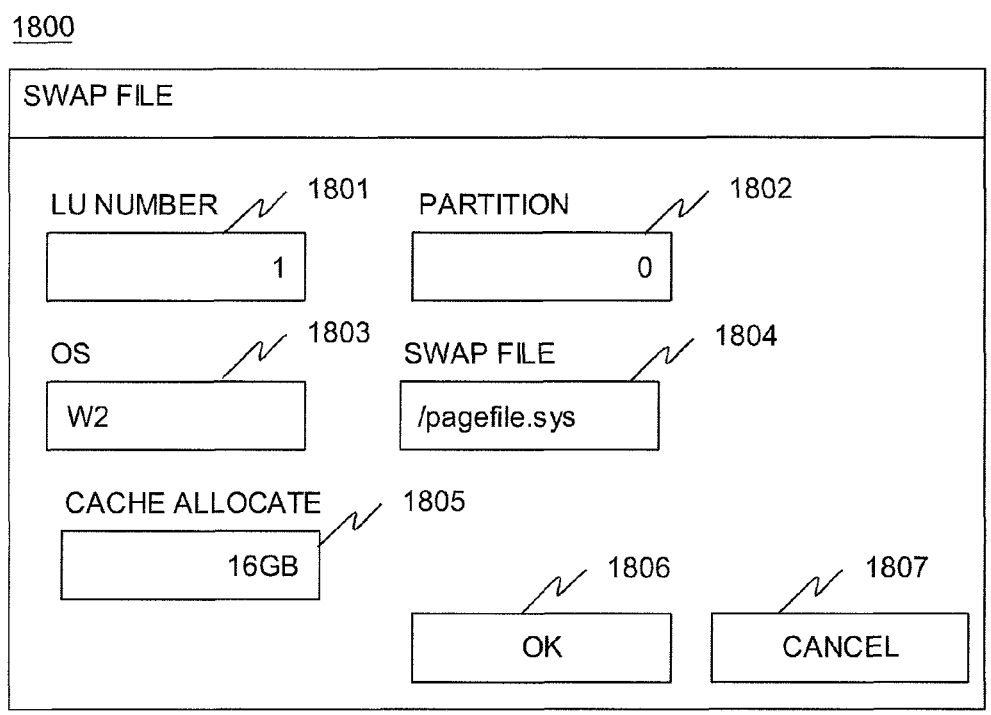
FIG. 18 is a block diagram of a swap file setting screen by the administrator.

FIG. 18 is a block diagram of a swap file setting screen to be executed by the administrator. By the processing of FIG. 16 executed by the MP, the swap area can be specified without any operation by the administrator. On the other hand, such as cases of customizing the storage to fit the development environment or other particular environments, there are cases where the typical storage methods are not employed for storing the swap file in the secondary storage. There are other cases where, when an OS is newly added to the server, compared to searching the entire area of the secondary storage by the method shown in FIG. 16, the direct specification of the file name and others by the user shortens the processing time for the swap area to reside in the cache memory. In such cases, the administrator directly specifies the swap file using this screen. The swap file setting screen 1800 has the LU number column 1801 that indicates where the OS is stored, the partition column 1802, the OS name column 1803 that specifies the stored OS, the swap file column 1804 that indicates the swap file, and the cache allocation column 1805 that indicates the size of the cache memory area to be allocated. If the administrator specifies each of those, and clicks the OK button 1806, the swap area is set according to the processing at s1609 of FIG. 16. If the CANCEL button 1807 is clicked, the mentioned above operation is not reflected in the setting and the processing is ended.

Figure 19:
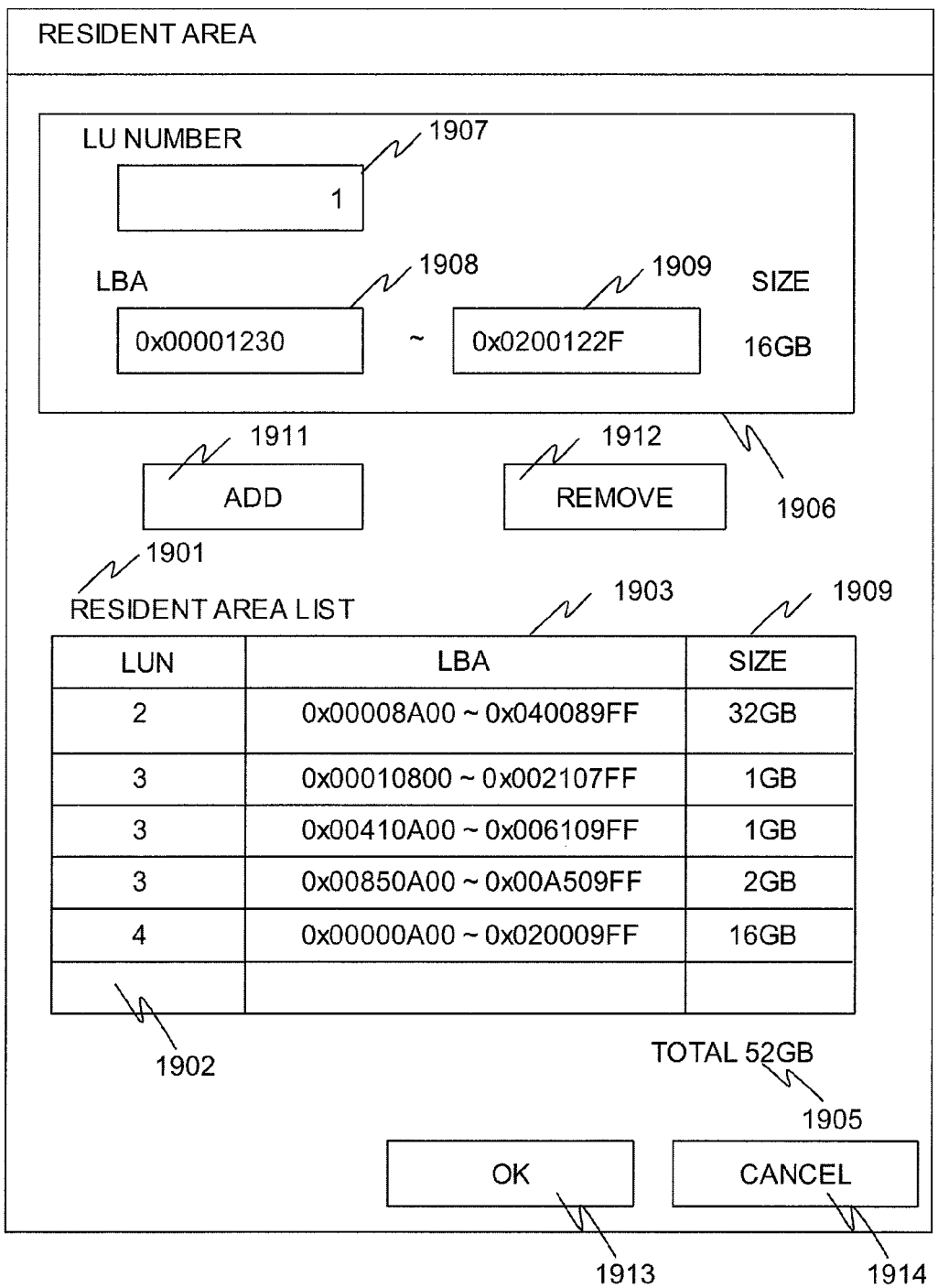
FIG. 19 is a block diagram of the screen for setting resident areas in a cache memory.

FIG. 19 is a block diagram of the resident area setting screen. By this screen, the setting by the processing of FIG. 16 or the setting with the setting by the administrator reflected in FIG. 18 can be checked. Besides, a resident area can be set individually. The resident area setting screen 1900 has a resident area list 1901 by which the setting status can be checked. The resident area list 1901 has the LUN column 1902, the LBA column 1903, and the size column 1904, each of which describes the areas which have been set to resident. Besides, the total 1905 is shown, by which the amount of cache memory that is made resident can be checked.

Furthermore, the addition operation field 1906 also exists, and the LU number column 1907, the starting LBA column 1908 and the ending LBA column 1909 that belong to it can be specified by the administrator. The area size is shown in the size column 1910, and for making the area resident, the ADD button 1911 can be clicked. In addition, for removing a certain resident area, select the line that indicates the relevant area in the resident area list 1901, and click the REMOVE button 1912. For reflecting the above-mentioned change, click the OK button 1913, or click the CANCEL button 1914 for discarding the change.

The description has been given of making the cache memory of the swap area for one physical server resident. On the other hand, as mentioned above, if the virtual machine (VM) technology is adopted, the degree of area insufficiency in the main memory 12 increases in accordance with the number of running VMs. Therefore, the embodiment that corresponds to the server environment that employs the VM technology is described below.

Figure 20:
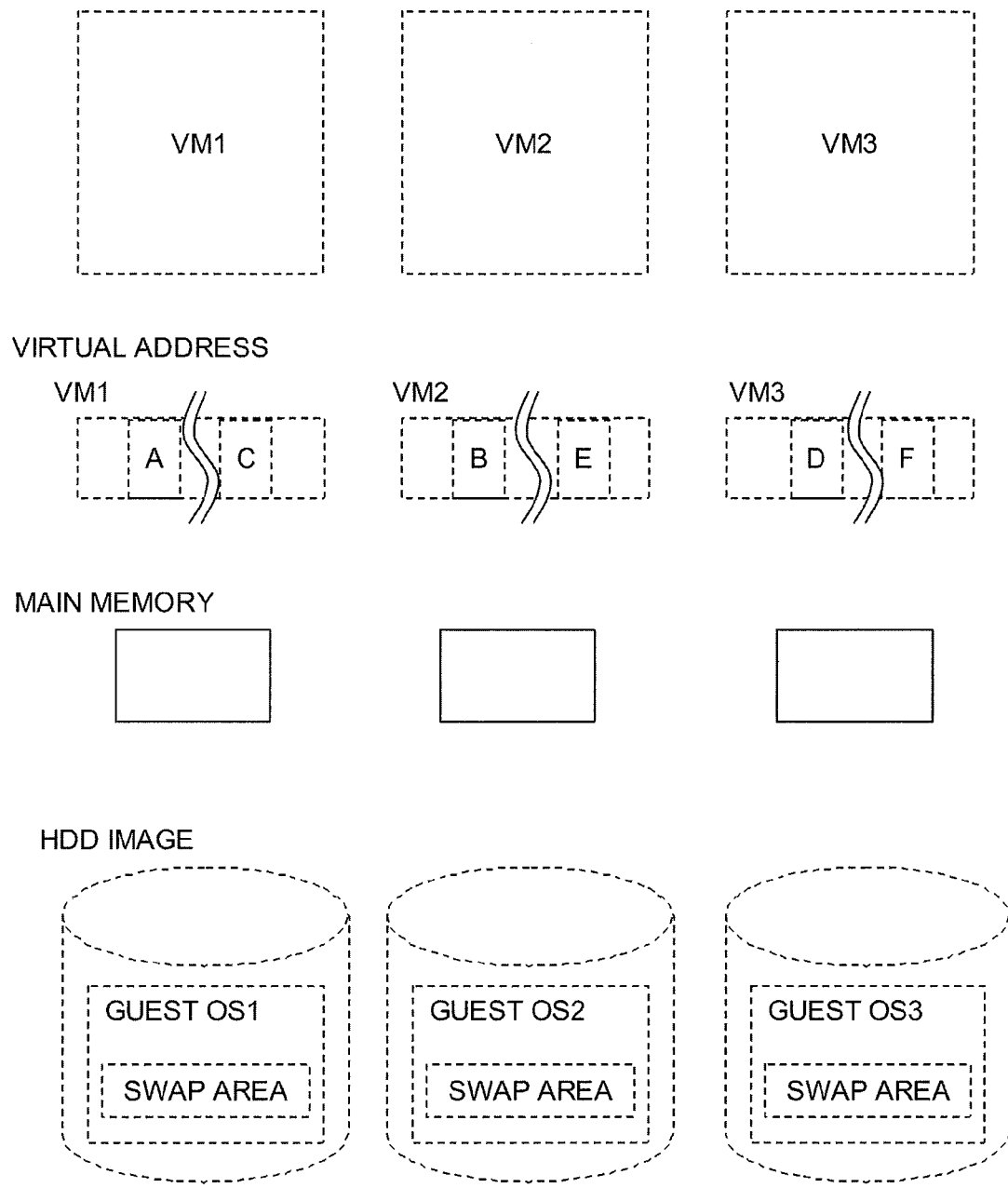
FIG. 20 is a block diagram describing an environment where virtual machines are used.
Figure 21:
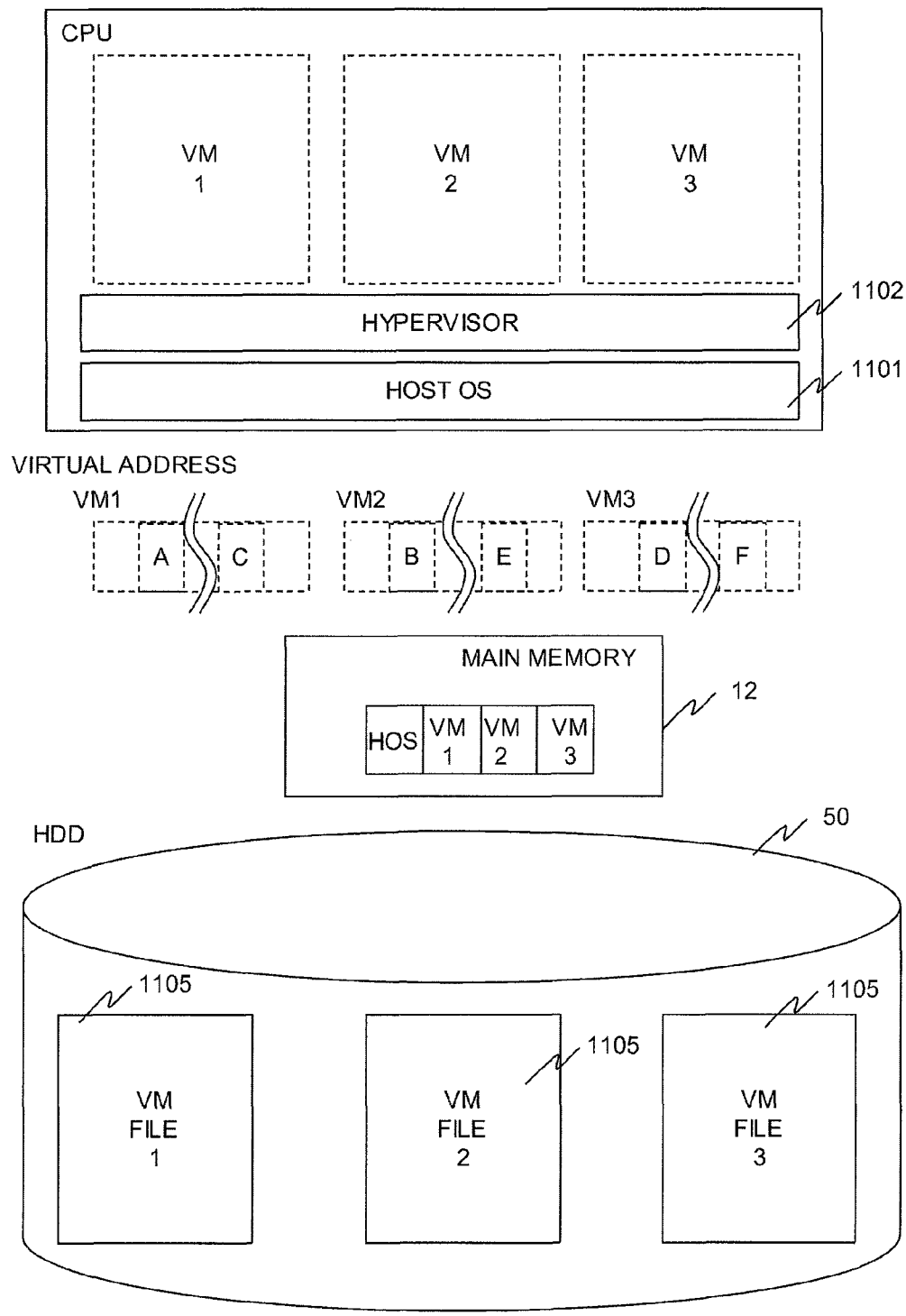
FIG. 21 is a block diagram that shows the relation of a virtual resource and a physical resource in the environment where virtual machines are used.

FIG. 20 is a block diagram describing the storage control system where the server uses VMs. Three VMs run on one storage control system. As in the environment shown in FIG. 4 where there is one physical server, each VM has a virtual address, a main memory to which the physical server is allocated, and the (HDD) image of the storage device which is the storage destination of various data including the swap area. FIG. 21 shows how these are related physically.

FIG. 21 shows the relation of a virtual storage resource and a physical storage resource in the environment where VMs are used. In this figure, one server 10 runs three VMs. In the CPU 11 of the server 10, the OS in an original sense is running. This OS is called the host OS 1101 to be distinguished from the OS running on the VM. In addition, as one of the applications in the host OS 1101, the software which provides the user with the virtual machine environment is operating. In particular, the software that, in the OS and the application that run in the VM, virtually provides the user with the same interface as in operating in the physical server is called the hypervisor 1102. By this hypervisor 1102, the virtual server VM is operated.

The OS also runs in each VM. This OS is called the guest OS to be distinguished from the host OS. As mentioned above, each VM has a virtual address. It is the same as the case where the OS is executed in the physical server. On the other hand, the physical address to utilize the main memory 12 which is a physical resource is inevitably limited. It is because, though the starting address of the physical address for access from each guest OS is set to zero by the hypervisor 1102, the capacity must be divided.

In an example of FIG. 21, the main memory 12 is divided into the host OS, the areas used by the other applications, and three more VMs. If the operations that have conventionally been done by the physical server is to be done by one VM and three similar VMs are to be executed as in this example, the physical memory area allocated to one VM becomes less than one third of the area when the physical server is used. That is, the probability of swap becomes more than three times higher.

Furthermore, with regarding to handling of a storage storing data and the like, there is a difference between the physical server and the VM environment. While the physical server can directly recognize the physical storage, the guest OS can recognize the storage (where the guest OS is stored) as a physical storage such as an HDD in the processing by the hypervisor 1102 in the VM environment, according to the data in the HDD image 11052 (FIG. 22) which is part of the VM file 1105 that stores the VM status and the like.

Figure 22:
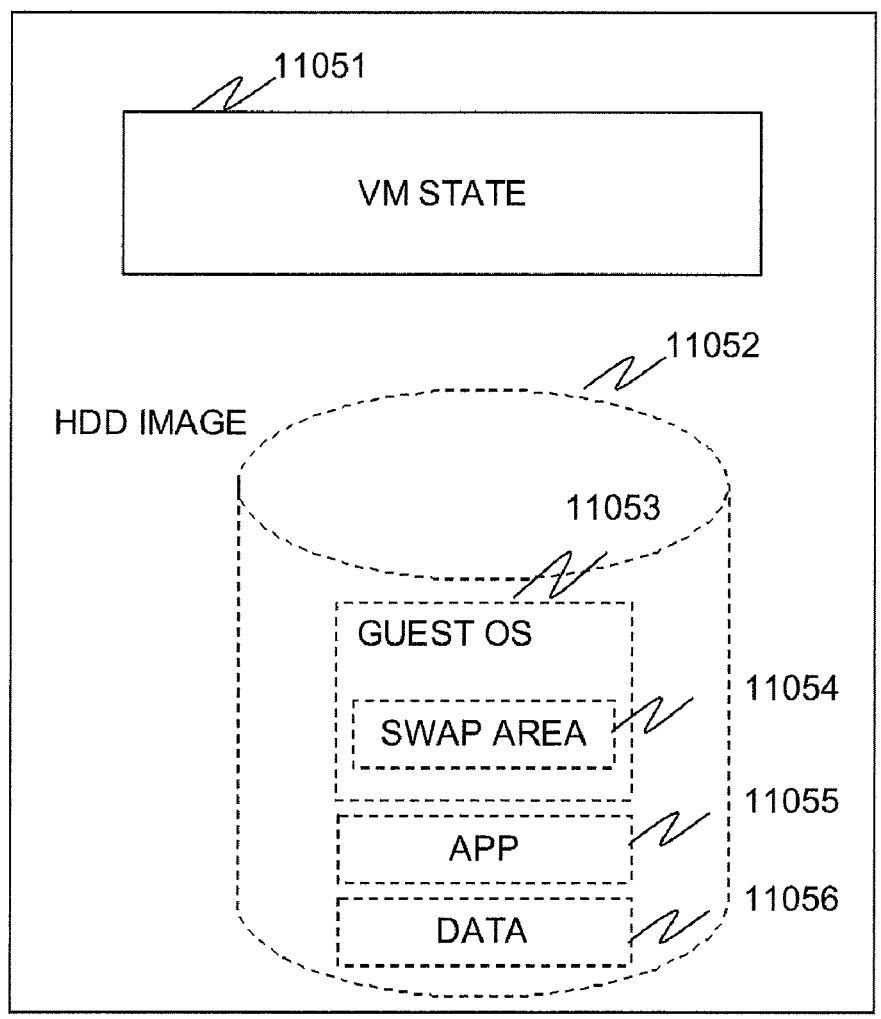
FIG. 22 is a block diagram that shows the configuration of a virtual machine file which stores the status of a virtual machine.

FIG. 22 in this document is a block diagram that shows the configuration of a VM file which stores the VM status. The VM file 1105 includes the VM status 11051 that indicates the VM setting and the program execution status and the HDD image 11052 that is the HDD data to which the VM is virtually coupled. The HDD image 11052 includes the images of the guest OS 11053 to operate the VM, the application 11055 installed by the user, and various data 11056. The area of the guest OS 11053 includes the swap area 11054 where, if the physical memory area is not sufficient for the guest OS 11055, the guest OS can execute the swap processing.

As shown in FIG. 16, the MP, by using the partition type and the file name, recognizes the swap area used by the host OS and sets it in the cache memory, and thus the host is able to load the data of virtual memory in the physical memory at a high speed. However, in the server environment where the VMs are running, the probability of swap occurrence increases, and though it is even more necessary, the storage system cannot employ the method. It is because the swap area is in the HDD image 11052 of the VM file 1105, and the method by using the partition type and the file name is not effective. Therefore, by the MP identifying the VM file 1105 and analyzing the HDD image 11052 in the VM file, the swap area 11054 of the guest OS has been made resident in the cache memory. This method is described further as follows.

Figure 23:
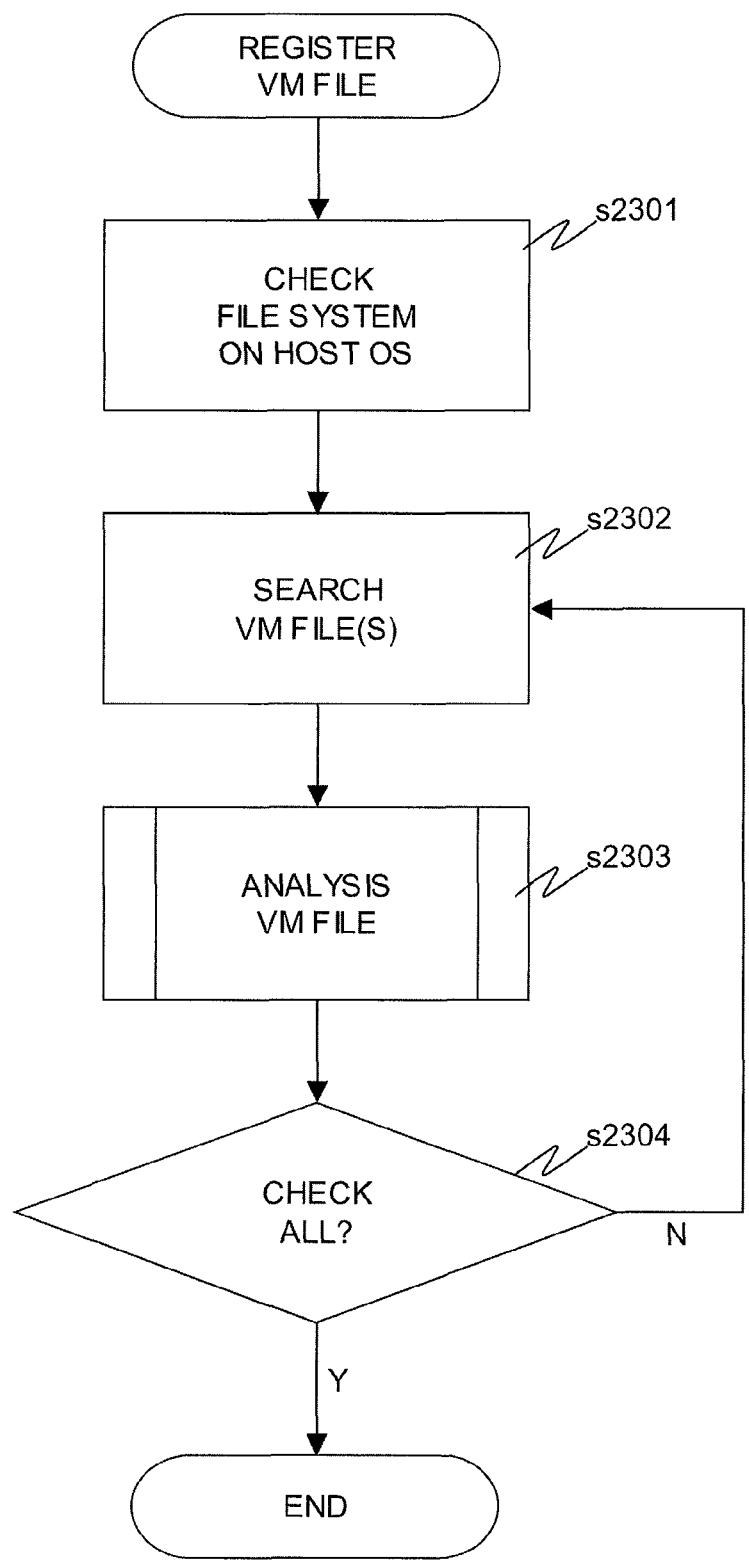
FIG. 23 is a flowchart that describes the processing of identifying a virtual machine file and registering it in the table.
Figure 27:
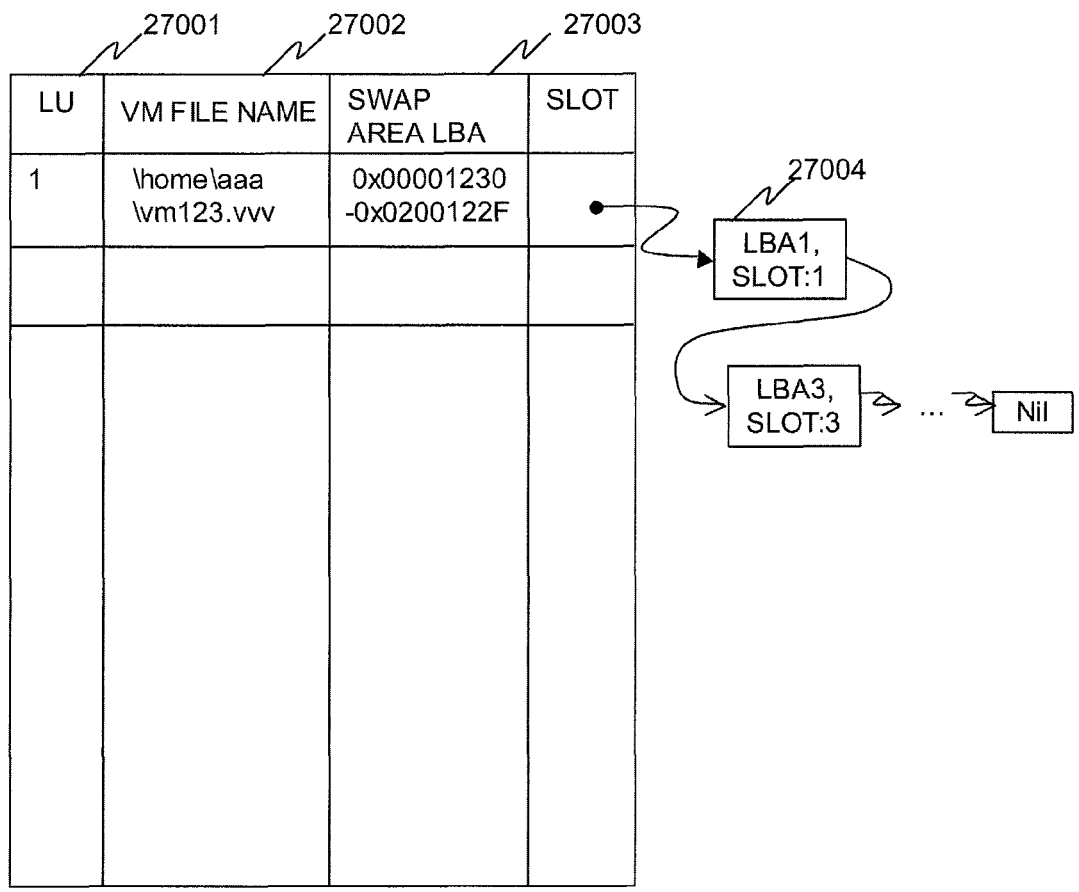
FIG. 27 is a block diagram of a virtual machine file swap area table.

FIG. 23 is a flowchart that describes the processing of identifying a VM file and registering it in the VM file swap area table (FIG. 27). It is executed by the MP 204 periodically or by the instructions from the administrator or the server through the SVP 207. If the SVP 207 can access the control memory 206 and the contents of the storage, the SVP 207 may execute the processing of FIG. 23. Firstly, as for the partition accessed by the host OS, the type of the file system running on the host OS is determined. This determination can be executed by the MP referring to the type of the partition stated in the MBR of the LU where a VM file is assumed to exist. In the processing of searching for the swap area and the like, the processing routine of this file system is used (s2301).

Next, the MP searches the VM file. In this process, the extension table 2500 is referred to and if there is a matching extension file, it is determined that there is a VM file (s2302). Next, the VM file is analyzed (s2303, see FIG. 24 for details). Subsequently, as for the partition, whether all the VM files have been searched is determined (s2304), and if there are VM files still remaining, the processing returns to s2302. If all the VM files have been searched, the processing of this partition is ended, and sequentially, the processing of FIG. 23 is employed for all the other LUs to be accessed by the host OS.

Figure 24:
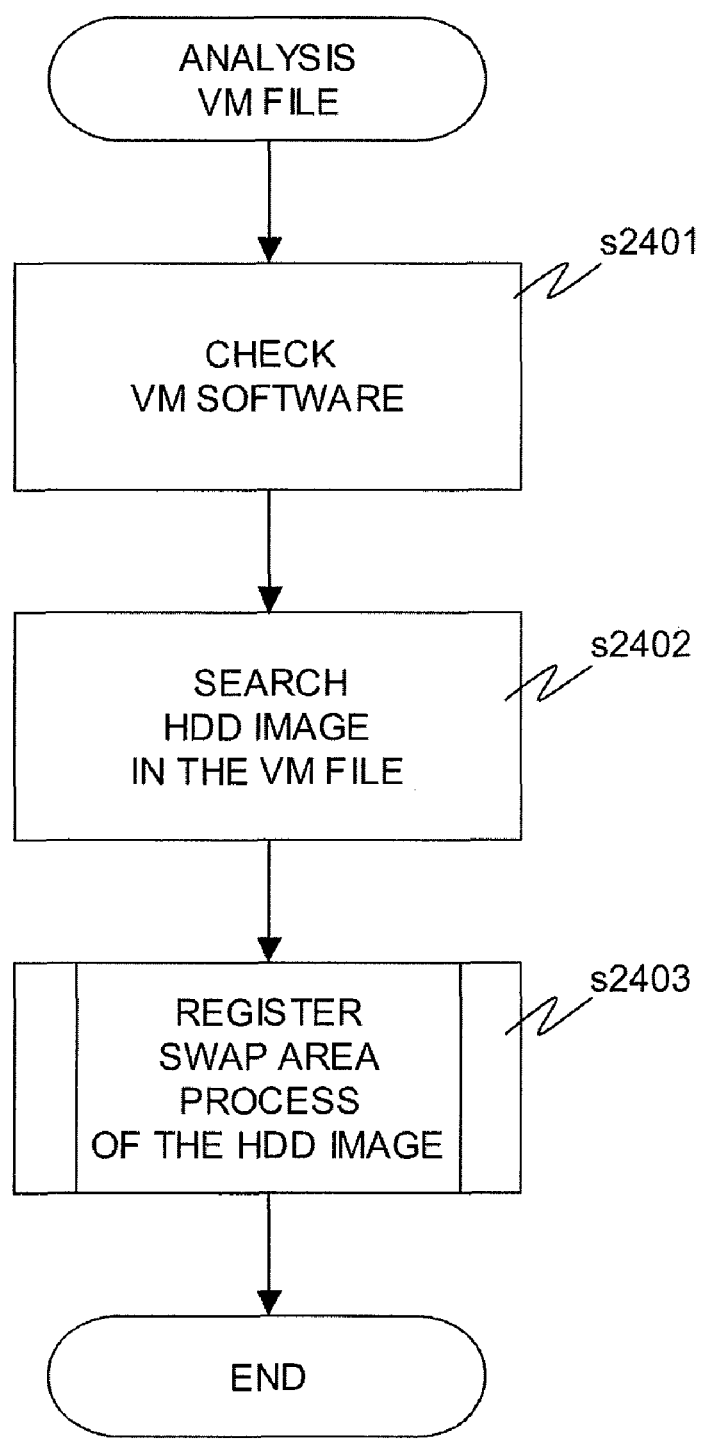
FIG. 24 is a flowchart of the analysis processing of a virtual machine file.

FIG. 24 is a flowchart of the analysis processing of a VM file (s2303). It is executed by the MP 204 or the SVP 207. As for the VM file hit through the processing s2302 of FIG. 23, to which VM software the VM file belongs is determined based on the extension and the magic number (s2401).

Next, by the VM file analysis routine corresponding to each VM software, the HDD image 11052 in the VM file is identified (s2402). As some pieces of software have their formats published, support such as VM file analysis is possible for multiple pieces of software by installing each VM file analysis routine. For example, if the format specifies that the offset value of the HDD image 11052 is stored in the 16th to 19th bytes from the head byte, read the offset value stored in the 16th to 19th bytes first, and add the offset value to the head address of the file, which is the head address of the HDD image 11052. Thus follow the format and identify the HDD image 11052. Furthermore, with the head address of the HDD image 11052 as an offset, execute the processing of FIG. 16 (s2403). This is executed by temporarily assuming the head address of the HDD image 11052 is 0 or through other methods. For example, suppose that the head address of the HDD image 11052 is 1234 and that the partition table is originally stored in the address 0. In that case, for checking the partition table in the HDD image 11052, the data of the address 1234, which is 1234 minus 0 that is the address to be accessed, is checked as the partition table. In installation, for example, it is possible to make the processing of FIG. 16 a subroutine with the LU number and the offset value as an argument, and call it, setting the offset value to 0 for the LU or setting the offset value to the head address of the HDD image for the VM file. Thus the swap area in the VM file can also be made resident in the cache memory.

FIG. 25 is a block diagram that describes the extension table. The extension table 2500 is stored in the control memory 206 along with other programs. This table is set as factory default in advance, upon updating the software, or by the administrator. The extension table 2500 has the VM software column 2501 and the extension column 2502, and shows their correspondence.

FIG. 26 is a block diagram of the VM file setting screen. By using the VM file setting screen 2600, the administrator can check the VM file that is currently resident in the cache memory, specify which VM file to make resident in the cache memory, or cancel it. The VM file setting screen 2600 has a VM file list 2601, which includes the resident swap area column 2602, the VM file name column 2603, and the swap area size column 2604. The resident swap area column 2602 indicates whether each corresponding VM file stated in the VM file name column 2603 is resident in the cache memory or not. If it is checked, it means that the VM file is resident in the cache memory.

Furthermore, by operating the resident swap area column 2602, the area can be set to either resident or nonresident. By specifying the status and clicking the OK button 2605, the addition to or deletion from the swap area table is executed, and the setting is reflected in the storage system. In the swap area size column 2604, the maximum size of the cache memory that can be allocated to the swap area and the size of the currently allocated cache memory are stated. The size to be allocated can also be specified. The size means how many components can be set for the LBA-slot list of the swap area table.

In addition, the VM file setting screen 2600 has the LU column 2606, the partition 2607, and the OS column 2608. By clicking the SEARCH button 2609 after setting the above, the VM file that corresponds to the specified condition is searched for. Furthermore, if the REFERENCE button 2610 is clicked, the file directory specification screen appears, and the file to be added to the list can be specified. It can be used when the OS specifies the image file that can be mounted as a device such as an HDD, including unregistered VM software or for purposes other than VM, and a part of the file such as the swap is made to be resident. Thus it is possible to check the VM file currently resident in the cache memory, specify which VM file to make resident in the cache memory, or cancel that specification.

In this invention, a VM starts to be resident in a cache memory when it accesses the VM file for the first time. Therefore, the area where there is an HDD is entered as a swap area in the VM file, and if there is no access from the VM to the relevant area, the relevant area is not actually allocated to the cache memory area.

Another usage of VMs can be suggested, that is, in a VM file, terminating the execution of the VM, creating a snapshot of that VM file, and executing the VM with the snapshot of the VM file. In that case, the method is not effective if the swap area of the VM file that is not used any more is still resident in the cache memory. Therefore, a method of releasing that relevant area is using the VM file setting screen.

FIG. 27 is a block diagram of the VM file swap area table. The VM file swap area table 2700 corresponds to the VM swap areas, has the format of the swap area table 2063 (FIG. 14) for the swap areas of the physical server with the VM file name column 2602 added to it, and is stored in the control memory 206. The VM file swap area table 2700 also has the LU column 2601, the VM file name column 2602, the swap area LBA column 2603, and the pointer for the LBA-slot list 2604. In particular, as this VM file swap area table 2700 also administrates the VM file names, it allows the user to check the VM file on the VM file setting screen in FIG. 26.

Figure 28:
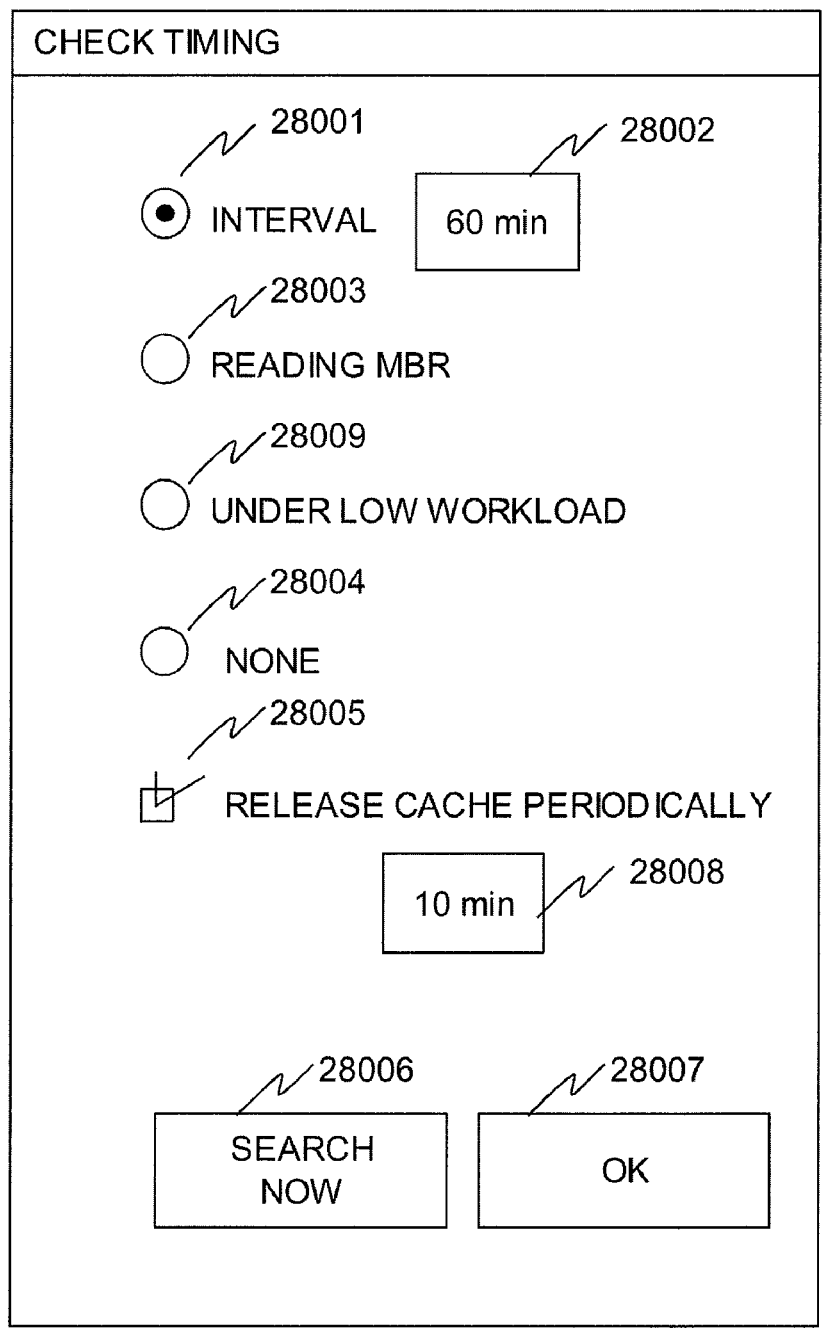
FIG. 28 is a block diagram of the operation screen for setting the timing to search a swap area and the timing to temporarily release the cache memory and review unused resident areas.

FIG. 28 is a block diagram of the check timing setting screen. The check timing setting screen 2800 prompts the user to set the timing to search the swap area and the timing to temporarily release the cache memory and search for unused resident areas. The check timing setting screen 2800 allows the user to select the timing to search the swap area among the icons 2800, including INTERVAL 28001, READING MBR 28003, UNDER LOW WORKLOAD 28009, and NONE 28004.

If the user selects INTERVAL 28001, the user can enter the interval of executing the search in the interval column 28002. As the MBR is read in booting the server, READING MBR 28003 means that the user will execute the search when starting the server. UNDER LOW WORKLOAD 28009 means that the user will execute the search in the timing when there is no messages accumulated or the number of accumulated messages is smaller than previously specified, by referring to the messages that are unprocessed or in processing accumulated in the mail box 206x.

In addition, the check timing setting screen 2800 also has the RELEASE CACHE PERIODICALLY column 28005. If this column is checked, the swap area in the cache memory is released in the interval stated in the release interval column 28008. Concretely, as for the swap area LBA column 27003 shown in the VM file swap area table 2700 of FIG. 27, if a specific LBA is entered in the cache directory information, the specific slot to which the LBA is allocated is released, and the slot is deleted from the cache directory information and the LRU information.

Note that, even if a slot is deleted, the LBA should not be deleted from the VM file swap area table 2700. This is because, even if it is registered in the VM file swap area table 2700, the LBA is not allocated to the cache memory unless the LBA is accessed by the VM, and therefore there is no penalty for registration to the table, and besides, it can be made resident immediately once the access to the LBA starts. The check timing setting screen 2800 also has the SEARCH NOW button 28006 for immediately starting the search, and the OK button 28007 for reflecting the setting.

Figure 29:
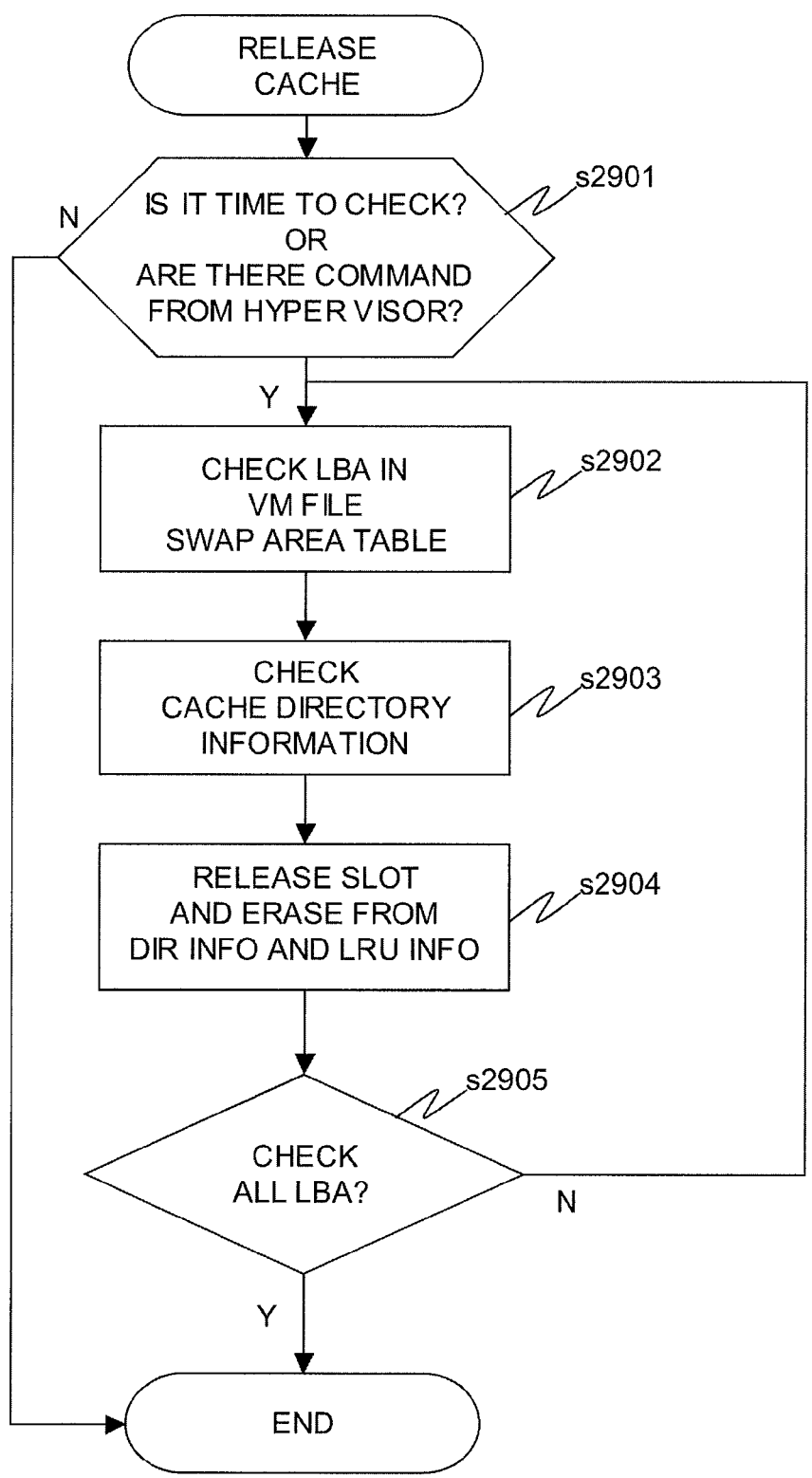
FIG. 29 is a flowchart that describes the processing of releasing a swap area in a cache memory.

FIG. 29 is a flowchart that describes the processing of releasing a swap table in the cache memory. As mentioned above, it might happen that, due to the quality of the VM environment, VM files are switched and the allocated swap file is not used any more. Therefore, there are some cases where the cache memory slot that has been allocated as the swap area must be released. This processing is executed by the MP 204.

Firstly, it is checked if the timing has matched the search interval set by the check timing setting screen 2800, or if there has been a VM file release message from the hypervisor (s2901). The VM file release message from the hypervisor is issued for the storage if the hypervisor has the collaboration function with the storage system. The VM file release message from the hypervisor can be sent through the channel, or it can be transmitted to the SVP by the LAN coupled to the server, and sent to the MP by the SVP. If neither of these are the case, the processing is over. If any of them is true, refer to the swap area LBA column 27003 in the VM file swap area table 2700 (s2902).

Next, by referring to the cache directory, it is checked whether there is an entry that matches the specification (s2903). If there is one, release the relevant slot, and delete the relevant entry from the cache directory information and from the LRU information (s2904). Furthermore, it is determined whether all the relevant LBAs have been checked (s2905), and if so, the processing is ended, and if there are any remaining, the processing is repeated from s2902. By this processing, deletion from the VM file swap area table 2700 is not executed. Thus the effect stated in FIG. 28 can be gained.

As a cache memory where virtual memory information is stored, besides DRAM, semiconductor memory that has high-speed response, such as flash memory, is adopted.

As this invention makes the swap area resident in the cache, the VM independence which is a prerequisite of a VM can be improved. For example, suppose that a certain VM makes sequential access as a storage access, not as a memory access. If the control described in this invention is not executed, the cache memory is filled with the data of that sequential access, and if the swap area has been allocated to the cache memory previously, it is ruled out. On the other hand, in this invention, even in such a case, the swap area that is critical for the system performance remains in the cache memory. Therefore, the sequential access by one VM does not affect other VMs, and the independence among VMs is improved.

Though the above-mentioned embodiment explained a case of dealing with this using the storage system 20, which VM file to execute or to terminate can be reported to the storage system 20 by the server 10 which controls the VM. Otherwise, the information of the swap area can be reported. This report can be sent as a special command through the channel 40, or a message can be sent through LAN 209.

Figure 30:
FIG. 30 is a block diagram that describes the virtual machine file status messages sent by the hypervisor.
Figure 30:
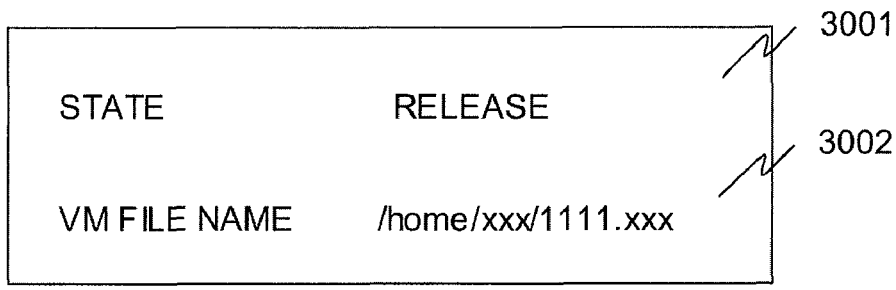
Figure 30:
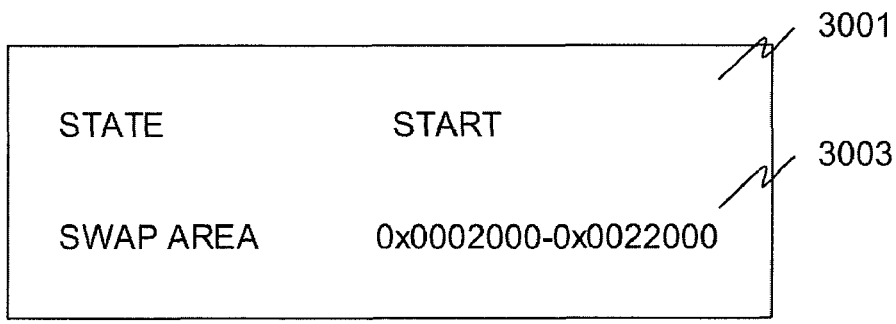

FIG. 30 is a block diagram that describes the VM status messages sent by the hypervisor. The VM status message 3000 consists of the status column 3001 and the VM file column 3002. Reference numeral 3000-1 is the status message that is sent in starting the execution of a new VM. The status column 3001 says "START," which indicates that the VM execution is started according to the VM file shown in the VM file column 3002. Similarly, reference numeral 3000-2 says "RELEASE" in the status column 3001, and it is sent in terminating the VM execution. On receiving the 3000-1 message, the processing of FIG. 29 is executed. Or, on receiving the 3000-2 message, the processing of FIG. 24 is executed. By using this message, the overhead for the storage system 20 such as executing a periodical search can be reduced. Besides, as it is not executed periodically, immediate registration or release is possible. In addition, as shown in 3000-3, by adding the swap area LBA column 3003, which area to be resident in the cache memory can be specified directly. In that case, the search process is not required, and the overhead for the storage system 20 can be reduced even more.

INDUSTRIAL APPLICABILITY

As described above, by the above-mentioned storage system, a swap area can be allocated to a cache memory without the administrator specifying the area address of virtual memory. Besides, since an area of virtual memory, and not the entire volume, can be made resident in the cache memory, the swap processing for the virtual memory can be realized in the environment where multiple VMs are running.

In addition, as the storage system executes the processing of referring to the stored data and finding the swap area, the server does not have to respond to the request, which realizes the high-speed swap processing. On the other hand, the storage system can execute the processing of finding the swap area in the timing that suits the load status of the storage system, which speeds up the response of virtual memory. Besides, since the swap area that is not used any more is excluded from the objects of making resident in the cache memory, the cache memory can be utilized efficiently. Furthermore, as the swap area of each VM is made resident in the cache area, the independence among multiple VMs can be improved.

The invention claimed is:

1. A storage system, comprising:
a secondary storage;
a channel interface coupled to a server;
a disk interface coupled to the secondary storage;
a cache memory for temporarily storing data to be sent to and received from the secondary storage; and
a processor;
wherein a swap area of a main memory of the server is allocated to the secondary storage;
wherein the processor refers to data stored in the secondary storage and specifies the swap area, stores the specified swap area in the cache memory, and sends data of the swap area of the cache memory to the main memory of the server;
wherein a host OS of the server runs a plurality of virtual machines;
wherein the secondary storage stores a plurality of virtual machine files storing the respective statuses of the plurality of virtual machines;
wherein each of the virtual machine files comprises a status unit showing the setting of the virtual machines and the execution status of programs, and an image unit as data of the secondary storage to which the virtual machines are virtually coupled, wherein the image unit includes a guest OS for running the virtual machines, and the guest OS includes a swap area for the guest OS to perform swap processing; and
wherein the processor determines a file system of the host OS;
searches for the virtual machine files based on the determined file system;
determines virtual machine software of the searched virtual machine files;
selects a virtual machine analysis program corresponding to the determined virtual machine software;
specifies the image unit of the virtual machine files based on the selected virtual machine analysis program;

specifies the swap area of the guest OS from the specified the image unit; and causes the specified swap area to reside in the cache memory.

2. The storage system according to claim 1,
wherein the processor determines the OS type;
specifies a swap file based on the determined OS type; and
determines an area storing the contents of the specified swap file of the secondary storage as the swap area.

3. The storage system according to claim 2,
wherein the processor specifies the swap file in accordance with the determined OS type.

4. The storage system according to claim 3,
wherein the processor selects a specific file name in accordance with the OS type;
searches for a swap file corresponding to the specific file name; and
causes the area storing the searched swap file to reside in the cache memory.

5. The storage system according to claim 3,
wherein the processor selects a first specific file name in accordance with the OS type;
searches for a first file having the selected first specific file name;
searches for a second specific file name related to the contents of the searched first file;
searches for a second file having the second specific file name;
determines the searched second file to be a swap file; and
causes the area storing the swap file to reside in the cache memory.

6. The storage system according to claim 1,
wherein the swap area is allocated to swap processing to be executed by an OS of the server.

7. The storage system according to claim 1,
wherein an OS of the server executes the virtual machines,
wherein the swap area is an area for an OS to be executed by the virtual machines; and
wherein the processor causes the swap area to reside in the cache memory.

8. The storage system according to claim 7,
wherein the processor selects a specific file name in accordance with the OS type, searches for a file stored in the image unit corresponding to the specific file name, and causes a storage area of the file to reside in the cache memory as the swap area.

9. The storage system according to claim 7, further comprising a channel for receiving a notice from a hypervisor managing the virtual machines to be executed by the server;
wherein the searching of a file is performed upon receiving the notice from the hypervisor.

10. The storage system according to claim 1, further comprising a channel for receiving a notice from a hypervisor managing the virtual machines to be executed by the server;
wherein the processor releases the allocation of the swap area to the cache memory upon receiving the notice from the hypervisor based on the access history from the server to the swap area.

11. A storage system comprising:
a secondary storage;
a channel interface coupled to a server;
a disk interface coupled to the secondary storage;
a cache memory for temporarily storing data to be sent to and received from the secondary storage; and
a processor;
wherein a swap area of a main memory of the server is allocated to the secondary storage;
wherein the processor refers to data stored in the secondary storage and specifies the swap area, stores the specified swap area in the cache memory, and sends data of the swap area of the cache memory to the main memory of the server;
wherein the processor searches for a file corresponding to a predetermined file name;
determines the searched file to be a virtual machine file recording the status of the virtual machines; and
specifies a storage image unit stored in the virtual machine file.

12. The storage system according to claim 11,
wherein the processor specifies a type of OS type to be executed by the virtual machines stored in the image unit.

13. A control method of a storage system having a secondary storage, a channel interface coupled to a server, a disk interface coupled to the secondary storage, a cache memory for temporarily storing data to be sent to and received from the secondary storage, and a processor, where a swap area of a main memory of the server is allocated to the secondary storage and a host OS of the server runs a plurality of virtual machines, the control method comprising:
referring by the processor to data stored in the secondary storage and specifying the swap area;
storing by the processor the specified swap area in the cache memory;
sending by the processor data of the swap area of the cache memory to the main memory of the server;
storing in the secondary storage a plurality of virtual machine files having the respective statuses of the plurality of virtual machines, where each of the virtual machine files has a status unit showing the setting of the virtual machines and the execution status of programs, and an image unit as data of the secondary storage to which the virtual machines are virtually coupled, the image unit including a guest OS for running the virtual machines, and the guest OS having a swap area for the guest OS to perform swap processing;
determining a file system of the host OS;
searching for the virtual machine files based on the determined file system;
determining virtual machine software of the searched virtual machine files;
selecting a virtual machine analysis program corresponding to the determined virtual machine software;
specifying the image unit of the virtual machine files based on the selected virtual machine analysis program;
specifying the swap area of the guest OS from the specified the image unit; and
causing the specified swap area to reside in the cache memory.

* * * * *